(12) United States Patent
Nakajima et al.

(10) Patent No.: US 7,697,815 B2
(45) Date of Patent: Apr. 13, 2010

(54) VIDEO PLAYBACK UNIT, VIDEO DELIVERY UNIT AND RECORDING MEDIUM

(75) Inventors: Yasuyuki Nakajima, Saitama (JP); Hiromasa Yanagihara, Saitama (JP); Masaru Sugano, Saitama (JP)

(73) Assignee: KDDI Corporation, Tokyo (JP)

( * ) Notice: Subject to any disclaimer, the term of this patent is extended or adjusted under 35 U.S.C. 154(b) by 1607 days.

(21) Appl. No.: 10/082,268

(22) Filed: Feb. 26, 2002

(65) Prior Publication Data

US 2002/0118952 A1    Aug. 29, 2002

(30) Foreign Application Priority Data

| Feb. 28, 2001 | (JP) | ............................. 2001-055398 |
| Mar. 21, 2001 | (JP) | ............................. 2001-080946 |

(51) Int. Cl.
*H04N 5/91* (2006.01)

(52) U.S. Cl. ............................. 386/46; 386/52; 386/95; 386/83; 715/723

(58) Field of Classification Search ................... 386/95, 386/69–70, 52–55, 46; 369/83; 715/723
See application file for complete search history.

(56) References Cited

U.S. PATENT DOCUMENTS

| 6,377,745 B2 | 4/2002 | Akiba et al. |
| 2001/0018693 A1 | 8/2001 | Jain et al. .................... 707/500 |
| 2003/0091329 A1 * | 5/2003 | Nakata et al. .................. 386/52 |

FOREIGN PATENT DOCUMENTS

| JP | 05-289650 | 11/1993 |
| JP | 06-110943 | 4/1994 |
| JP | 08-163479 | 6/1996 |
| JP | 09-224231 | 8/1997 |
| JP | 10-079916 | 3/1998 |

(Continued)

OTHER PUBLICATIONS

Japanese Office Action dated Jul. 26, 2006, issued in corresponding Japanese Application No. 2001-080946.

*Primary Examiner*—Marsha D Banks Harold
*Assistant Examiner*—Daniel Tekle
(74) *Attorney, Agent, or Firm*—Westerman, Hattori, Daniels & Adrian, LLP

(57) ABSTRACT

The present invention relates to the video playback unit of one or a plurality of videos, the delivery unit and the recording medium for recording the program of the processing of these units. The video playback unit of one video reads in order the video data of the video file from the storage unit. The display displays the video data, the time information sequence data and the still image sequence data positioned before and after the playback time of the video data. In this way, the video scene contained in the video file stored in the storage unit and the video file within the server network-connected can be effectively read or the target scene can be effectively retrieved. On the other hand, the playback unit of a plurality of videos divides a plurality of videos read from the storage unit into the main videos and the proxy videos so that these videos can be simultaneously displayed. In this way, a plurality of videos can be played back even in a limited transmission bandwidth and decoding capacity.

33 Claims, 17 Drawing Sheets

FOREIGN PATENT DOCUMENTS

| | | |
|---|---|---|
| JP | 10-228758 | 8/1998 |
| JP | 11-238363 | 8/1999 |
| JP | 2000-209258 | 7/2000 |
| JP | 2000-253351 | 9/2000 |
| JP | 2000-324439 | 11/2000 |
| JP | 2001-060385 | 3/2001 |

\* cited by examiner

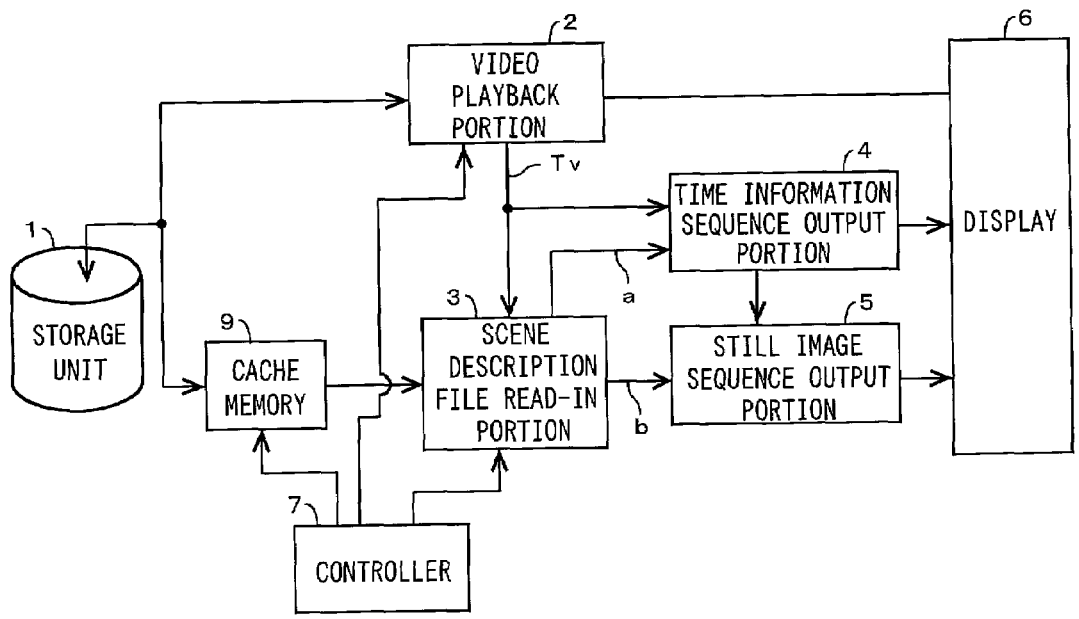
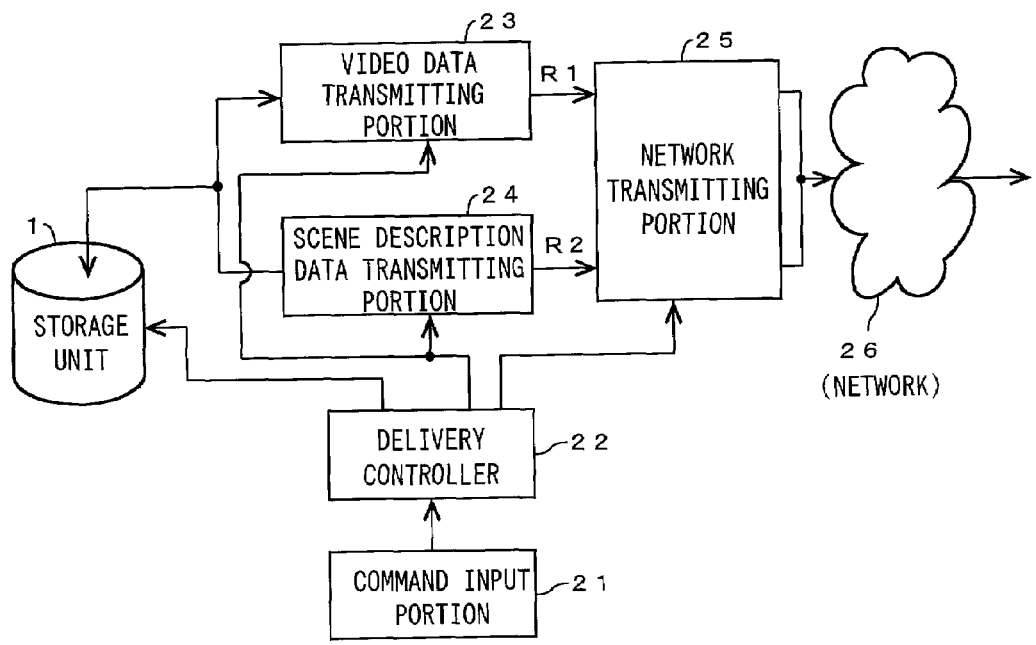

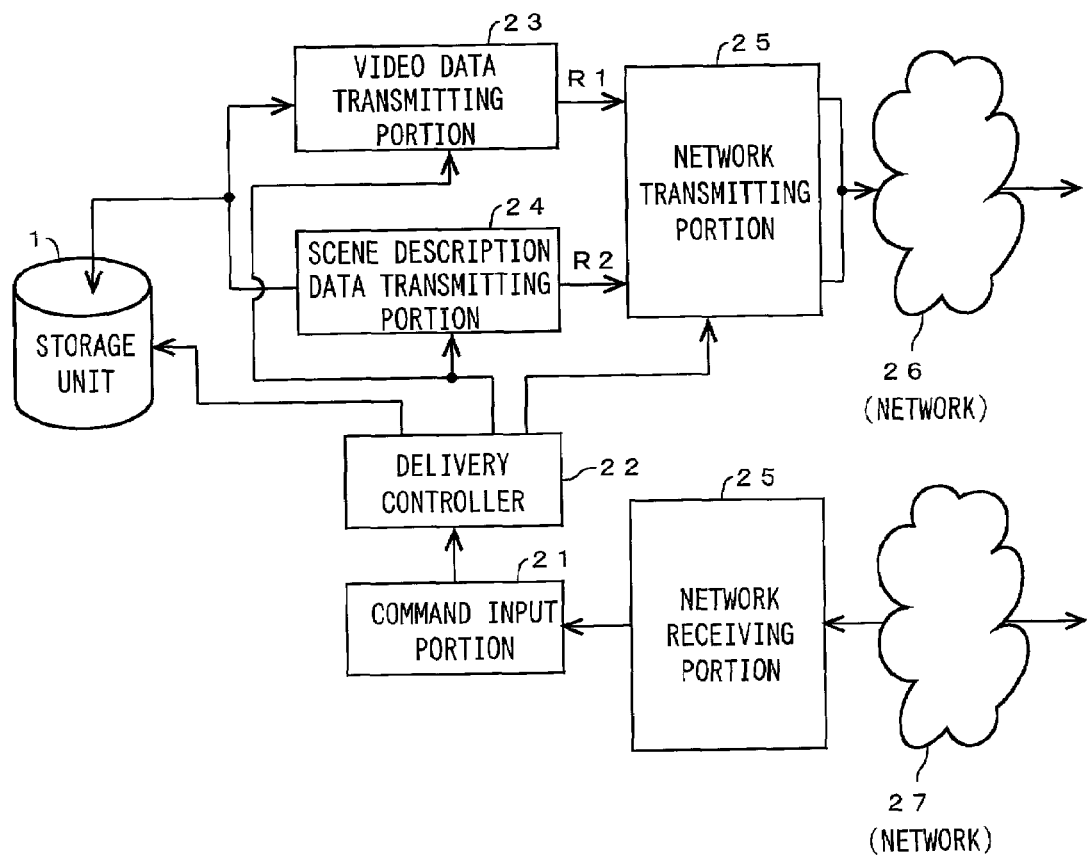

VIDEO PLAYBACK UNIT, VIDEO DELIVERY UNIT AND RECORDING MEDIUM

BACKGROUND OF THE INVENTION

1. Field of the Invention

The present invention relates to a video playback unit of one or more than plurality of videos, a delivery unit and a recording medium.

2. Description of the Related Art

First, one example of a conventional unit capable of playing back and retrieving one video will be described with reference to FIG. 25. In FIG. 25, a video playback portion 120 reads video data in order from a storage unit 110 by control of a controller 100, and outputs a screen output signal, an audio output signal and a current playback time on a display 130. Further, the video playback portion takes a length of the entire video as a playback length P and outputs it to a playback starting time setting portion 101. When the time to start a playback is set by the playback starting time setting portion 101, the playback starting time setting portion 101 outputs a setting time (q) to the video playback portion 120. When the setting time (q) is inputted, the video playback portion 120 takes the video data of recording position information in the vicinity of the setting time from the storage unit 110 and performs the playback thereof. The display 130 takes a screen output signal, an audio output signal and a current playback time and performs the displaying of the video output, the audio output and the current playback time.

Another example of the conventional unit will be described with reference to FIG. 26. This conventional example is, as shown in the drawing, constituted by a client terminal 105 as the playback unit and a server system 102 connected by a network 104, and the video data are stored in the server system 102.

The controller 100 sends a control signal to the video playback portion 120, and requests the video playback portion 120 to play back a video. The video playback portion 120 sends a video request signal (r) to a server system 102 via a network 104. The server system 102 reads the request signal (r) by a video server 103, and sends designated video data to the video server 103 from the storage unit 110. The video server 103 transmits the video data to a client terminal 105 via the network 104.

The client terminal 105 stores the transmitted video data once in a buffer 106, and transfers it to the video playback portion 120. The video playback portion 120 reads the video data and outputs the screen output signal, the audio output signal and the current playback time to a display 130. Subsequent retrieval actions by using a playback starting time setting portion 101 are the same as those of the above described FIG. 25 and, therefore, the description thereof will be omitted.

The method of setting a playback starting time (setting time (q)) for the playback starting time setting portion 101 as in FIG. 25 and FIG. 26 has conventionally used the following methods of (1), (2). (1) The method of directly inputting the playback starting time. (2) The method of taking a length of the entire video as 100% and determining a designated ratio within that length as the playback starting time.

However, since the setting methods (1),(2) of the above described playback starting time do not reveal what sort of videos are stored at which position of the video data, an user is obliged to set several sorts of times by a time code or a scroll bar and, by playing back according to those setting times, to play back his target videos. For this reason, there was a problem that the retrieval of the videos took a lot of times and labors.

Next, one example of the conventional unit for simultaneously playing back a plurality of videos is shown in FIG. 27. By control of the controller 100, the video playback portions 101 to 10n take in order a plurality of video data 1 to n from the storage unit 110, and input them to video playback portions 101 to 10n. The video playback portions 101 to 10n reads in order the video data and outputs the screen output signal, the audio output signal and the current playback time to the display 130. The display 130 takes the playback time, the screen output signal and the audio output signal and performs the display of the playback time, the screen output and the audio output.

This conventional unit has a demerit that, since a processing load corresponding to the number of video data is imposed, the number of videos to be playing back is limited when the playback processing is performed by, for example, a software.

The conventional unit for simultaneously playing back a plurality of videos and playing back from a designated time is shown in FIG. 28. For example, when a length of the entire video from the video playback portion 101 is inputted to a playback starting time setting portion 201 as a playback length, the playback starting time setting portion 201 sets a time for performing the playback and outputs the setting time to the video playback portion 101. By so doing, the video playback portion 101 sets the recording position information of the video data in the vicinity of the setting time, and takes the video data from a designated recording position from the storage unit 110 and performs the playback thereof.

The setting method of the playback starting time at the playback starting time setting portion 201 uses the following two methods:

(1) The method of directly inputting the playback starting time.
(2) The method of taking the entire length of video data as 100% and determining a designated ratio within that length as the playback starting time.

Since this conventional unit does not reveal what sort of videos are stored at which position, the user is obliged to set several sort of times and performs the playback from those times onward by way of trial so as to find his target videos and play back the videos of that target. For this reason, there was a problem that the retrieval of the videos took a lot of times and labors.

The other conventional unit includes those where the above described storage unit 110 is provided within the server system connected via a network, and the videos necessary for playback are transmitted to a plurality of video playback portions via the network. However, in the case of this conventional unit, a bandwidth necessary for the transmission of videos depends on the number of videos, there was a problem that a line for high bandwidth is necessary for simultaneous network transmission.

SUMMARY OF THE INVENTION

An object of the present invention is to provide a video playback unit and a delivery unit of videos capable of effectively browsing video scenes contained in video files stored in the storage unit and video files within the server network-connected, or effectively retrieving the target scenes.

Another object of the present invention is to provide the video playback unit and the delivery unit of a plurality of videos capable of simultaneously playing back video files stored in the storage unit and a plurality of video files within the server network-connected without increasing a processing load of playback terminals, transmitting and browsing a plurality of videos even within a limited network bandwidth, or browsing, retrieving and playing back the video scenes contained in the videos.

Still another object of the present invention is to provide a recording medium capable of reading with a computer which records the program capable of being played back or performing delivery processing.

In order to achieve the above described object, a first characteristic of present invention is that the video playback unit comprises: video playback means for reading in a designated video file and outputting in order to play back the video of the video file; scene description file read-in means for reading in the scene description file which describes the scene inside the video file; means for outputting the time information sequence existing before and after the playback time of the video within the time information described in the scene description file; means for outputting the still image sequence corresponding to the time information displayed, wherein the still image is described in the scene description file; means for renewing the display of the time information sequence and the still image sequence by synchronizing with the playback time of the video; and display means for displaying the above described video, time information sequence and still image sequence.

According to this characteristic, the scene description information can be displayed in step with the playback of the video, and the retrieval and browsing before and after the video that is being played back can be effectively performed.

Further, a second characteristic of the present invention is that it comprises: video description file processing means for reading in a video description file of a designated video group; main video playback means for playing back a first main video file designated by the video information described in the video description file; proxy video file playback means for playback a second proxy video file designated by the video information described in the video description file; and the display means for displaying the first main video and the second proxy video played back by the main video playback means and proxy video playback means, wherein the above described proxy video file is made smaller in a file size or in a coded bit rate in contrast to the above described main video file.

According to this characteristic, since a plurality of videos are constituted by the main video and the proxy video and played back, a plurality of videos can be effectively played back even in a limited transmission bandwidth or decoding capacity.

BRIEF DESCRIPTION OF THE DRAWINGS

FIG. 9 is a block diagram showing a schematic constitution of the third embodiment of the present invention;

FIG. 10 is a block diagram showing the schematic constitution of a fourth embodiment of the present invention;

FIG. 11 is a block diagram showing a modified embodiment of the fourth embodiment;

DETAILED DESCRIPTION OF THE PREFERRED EMBODIMENT

Figure 1:
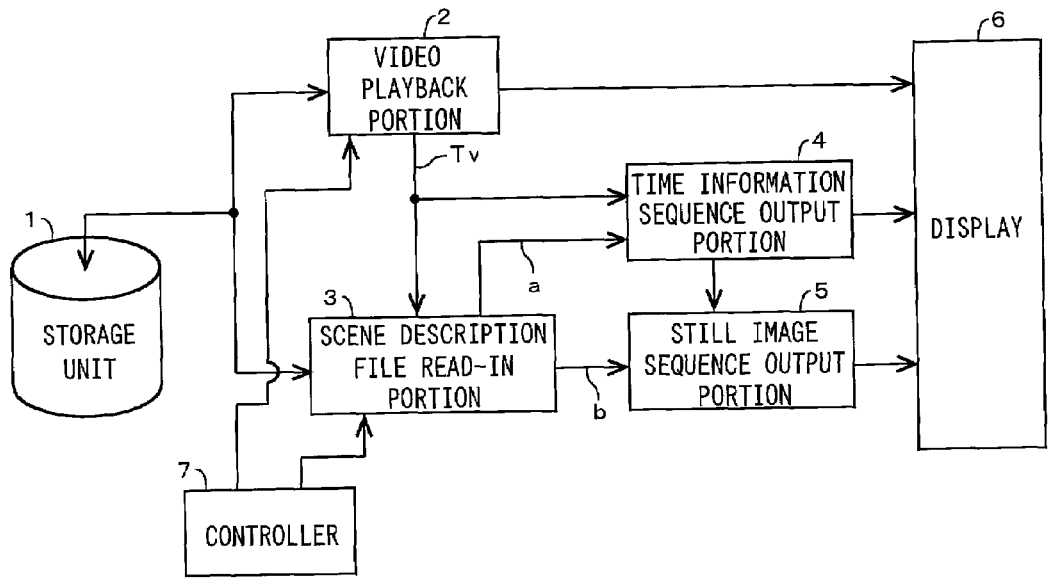
FIG. 1 is a block diagram showing a schematic constitution of a first embodiment of the present invention.
Figure 2:
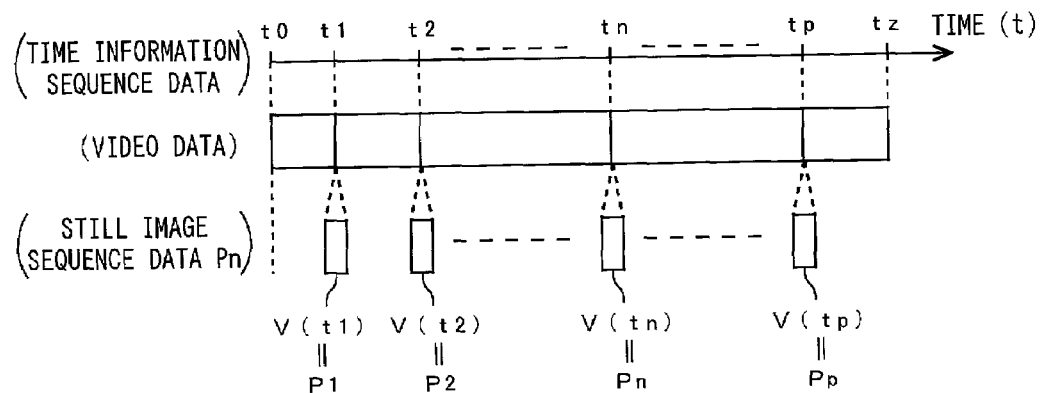
FIG. 2 is a conceptual illustration of videos stored in a storage unit of FIG. 1.

FIG. 1 is a block diagram showing a schematic constitution of a first embodiment of the present invention. The video file stored in a storage unit 1, as shown in FIG. 2 for example, comprises at least a video data (containing audio data), a still image sequence data V (tn)=Pn and a time information sequence data (tn) showing the time of the still image sequence data.

A video playback portion 2 takes in order the video data of the video file designated by control of a controller 7 from the storage unit 1, and outputs a screen output signal, an audio output signal and a current playback time to a display 6. The display 6 takes the current playback time, the screen output signal and the audio output signal, and performs the display of a playback time, the display of the screen output and the audio output. The video playback portion 2 can play back the video from the time decided, for example, by time information selected within at least one of the time information sequence and the still image sequence to be described later. For example, in the display screens of FIGS. 3A, 4A to be described later, if any one from a time information sequence T or a static screen sequence P is selected by a mouse and the like, the playback can be started from that selected time or that video of the static screen.

A scene description file read-in portion 3 can read a time information sequence data positioned before and after the current playback time from the time information sequence file stored in the storage unit 1 by control of the controller 7. The scene description file read-in portion 3 can also read the still image sequence data corresponding to the time information sequence data from a still image file stored in the storage unit. 1. The scene description file read-in portion 3 can read in the above described time information sequence data and the above described still image sequence data of the predetermined number of pieces.

The current playback time (Tv) obtained in the video playback portion 2 is inputted to the scene description file read-in portion 3 and a time information sequence output portion 4. The scene description file read-in portion 3 take the time information sequence data and the still image sequence data from the storage unit 1 based on the current playback time information (Tv), and inputs a time information sequence data (a) to the time sequence information sequence output portion 4 and a still image sequence data (b) to a still image sequence output portion 5, and displays the time information sequence and the still image sequence on the display 6. Incidentally, assuming that the playback time of the video data is taken as (To), since the relationship between the time information sequence data (tn) in the video file and the current playback starting time (Tv) is tn=Tv−To, the scene description file read-in portion 3 can take the time information sequence data and the still image data from the storage unit 1 by using this relationship.

Display examples of the display 6 are shown in FIGS. 3A, 3B and FIGS. 4A, 4B. On the display 6, a screen output V (Tv) of the current playback time, the time information sequences $T_{n-2}$, $T_{n-1}$, $T_n$, $T_{n+}$, $T_{n+2}$ and the still images $P_{n-2}$, $P_{n-1}$, $P_n$, $P_{n+1}$, $P_{n+2}$ are, for example, displayed as illustrated. Further, the time information sequence T and the still image P are displayed in relation to the screen output V (Tv).

Figure 3A:
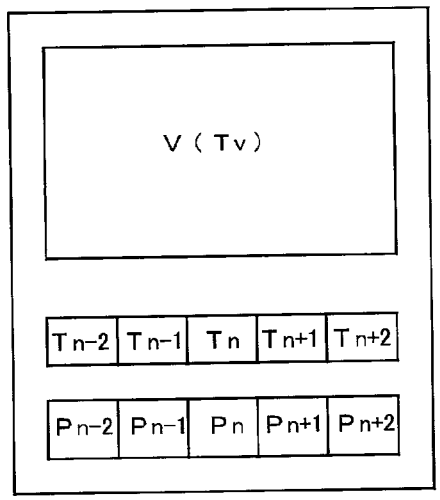
FIGS. 3A, 3B are views showing display examples of videos displayed on a display of FIG. 1.
Figure 3B:
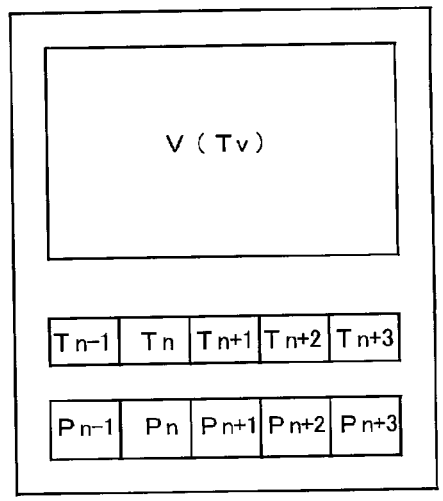
Figure 4A:
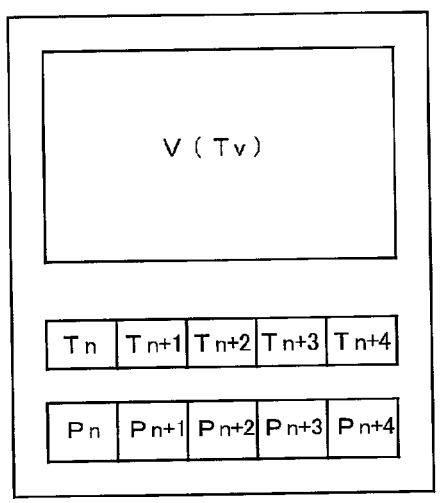
FIGS. 4A, 4B are views showing the display examples of videos displayed on a display of FIG. 1.
Figure 4B:
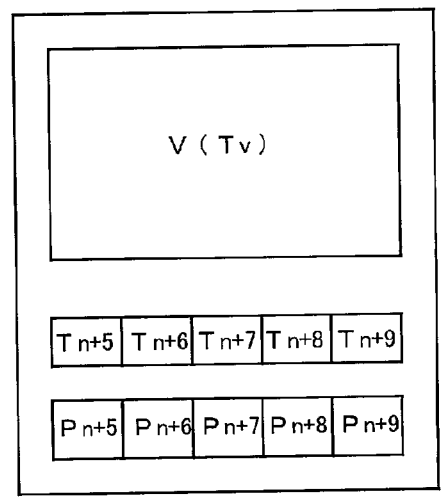

The renewal of the display of the still image sequence P of the display 6 is performed at a point of time when (Tv) has passed $T_{n+1}$ assuming that the video being played back is taken as V (Tv) at a point of the time (Tv), the nth time information in the scene description file is taken as (Tn), and the still image is taken as (Pn) in the examples of FIGS. 3A, 3B. On the other hand, in the examples of FIGS. 4A, 4B, at a point of time when the time (Tv) of the playback video has passed $T_{n+5}$, the whole of the time information sequence T and the still image sequence P are eliminated, and by displaying the time information sequence T and the still image sequence P which begin from a new time information $T_{n+5}$ and a new still image $P_{n+5}$, the renewal of a display content is performed. The renewal of this display content is just one example, and the renewal may be of other display contents.

Figure 5:
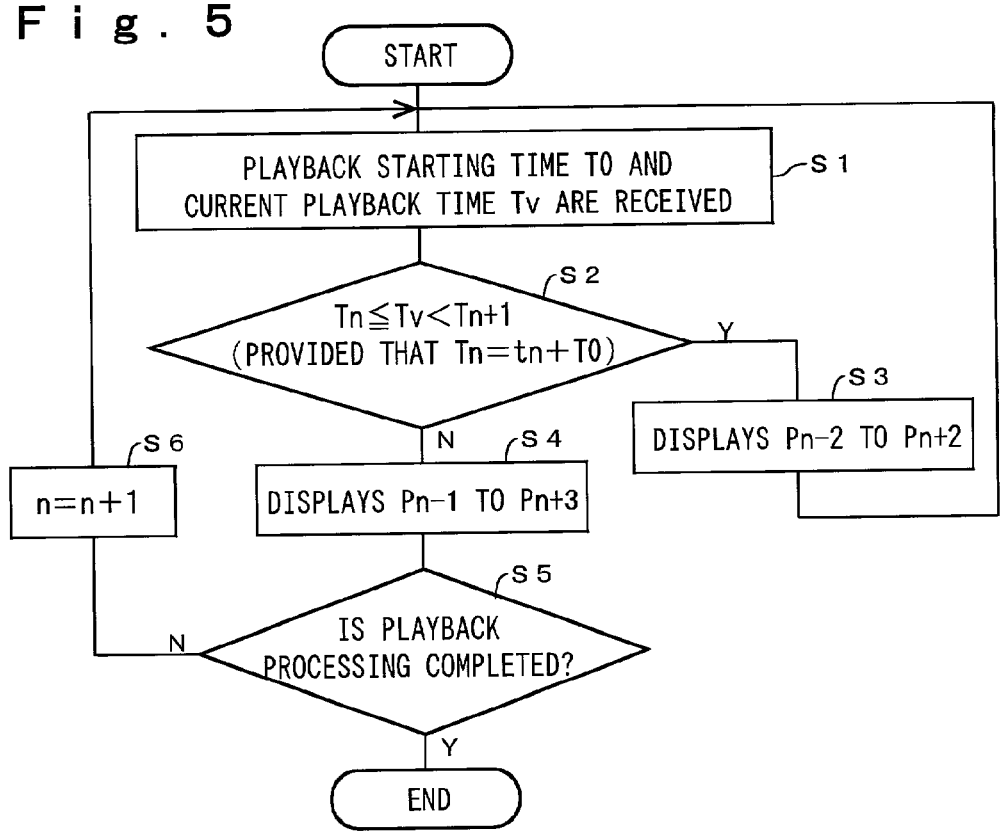
FIG. 5 is a flowchart for explaining one example of the function of a time information sequence output portion of FIG. 1.

The renewal of the display content can be performed by the time information sequence output portion 4. A renewal action of the display content of the time information sequence output portion 4 will be described with reference to a flowchart of FIG. 5. In step S1, the time information sequence output portion 4 receives a playback starting time (TO) and a current playback time (Tv) from the video playback portion 2. In step S2, it is determined whether the current playback time (Tv) realizes $Tn \leq T < T_{n+1}$, (provided that Tn=tn+TO) or not for a time information (Tn) and $T_{n+1}$ a still image. When this determination is affirmative, the process advances to step S3 and displays still images $P_{n-2}$ to $P_{n+2}$. On the other hand, when the determination of step S2 is negative, the process advances to Step S4 and changes the display of the still images to $P_{n-1}$ to $P_{n+3}$. In step S5, it is determined whether the playback processing is completed or not and, when this determination is negative, the process advances to step S6, and 1 is added to n. Hereinafter, the same actions as described above are repeated until the above described step S5 becomes affirmative.

Incidentally, as for the content of the time information sequence data (tn), various description methods related to the videos can be used. As one example, a time code sequence being increased by a designated time step, a time code sequence of a top of a cutting point showing a change of a video scene, a time code sequence of a key frame point showing a center of a scene, a time code sequence showing a changing point of an accompanied audio from an audible sound to a non-audible sound, a time code sequence showing the time when a specific effective sound such as clapping, laughter and the like were generated, a time code sequence showing the time when a specific video such as a telop, a CG video and the like were generated, a time code sequence designated arbitrarily by the user, or a time code sequence combining all those described as above can be used. Further, the starting time and the section length of each scene can be used as the time information sequence.

Figure 6A:
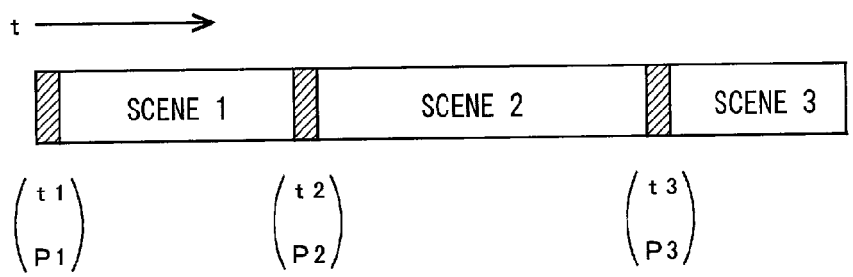
FIGS. 6A, 6B are explanatory drawings of specific examples of a time information sequence and a still image sequence.
Figure 6B:
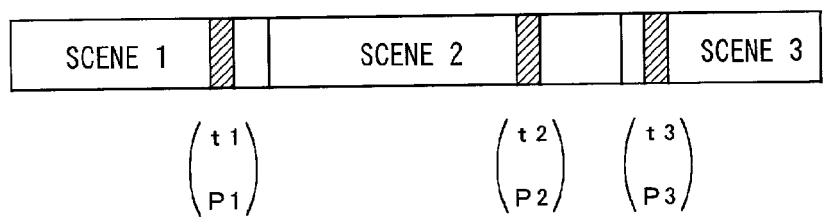

FIG. 6A shows an example where video scene switching times t1, t2, are used as the time information sequence and videos P1, P2, at those times are used as the still image sequence. FIG. 6B shows an example where key frame point times t1, t2, . . . in the scene are used as the time information sequence and the videos P1, P2 . . . at those times are used as the still image sequence.

Incidentally, in the case where the scene description file is read into the scene description file read-in portion 3 from the storage unit, there are two types of read-in methods available where the whole of the scene description file is read in and where the scene description file only corresponding to the fixed time information sequence and still image sequence is read in. In the former case, there is a problem that it takes a plenty of reading time since all the information is stored, while in the later case there is a merit of being able to output the scene description file at high velocity once it is read. On the other hand, in the later case, though the reading time of the scene description file is short, it is necessary to read in the scene description information from the storage unit each time the display of the scene description information is renewed.

Figure 7:
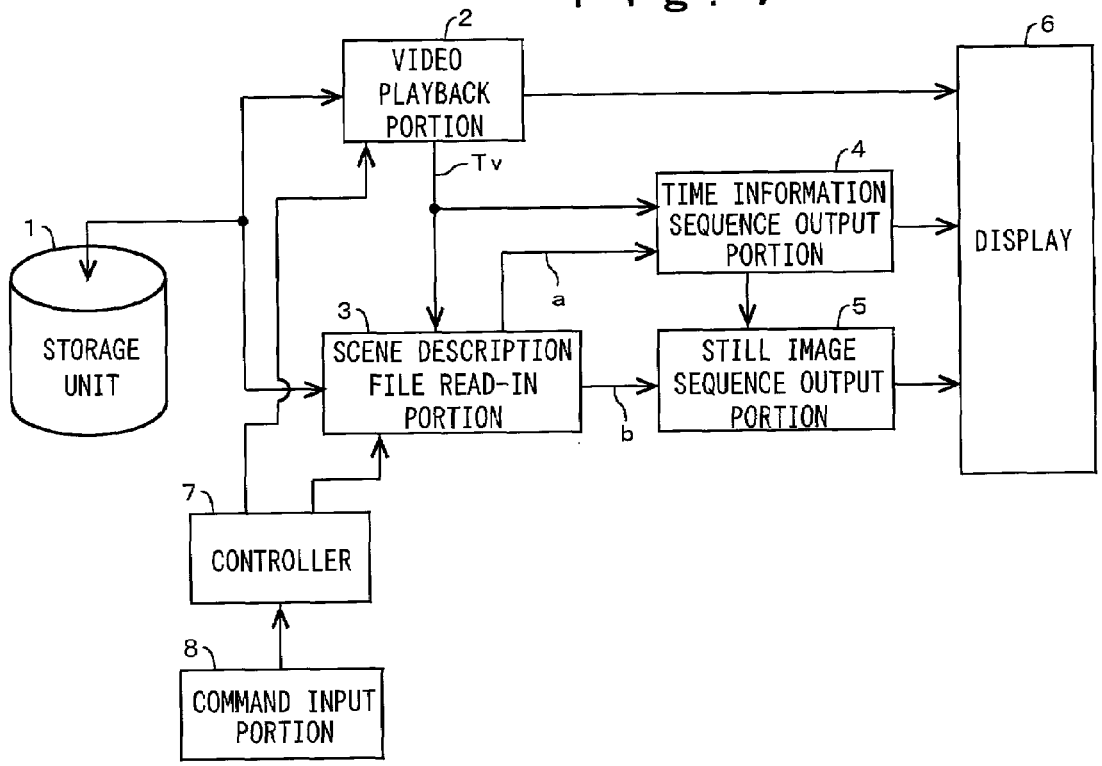
FIG. 7 is a block diagram showing a schematic constitution of a second embodiment of the present invention.

Next, a second embodiment of the present invention will be described with reference to the block diagram of FIG. 7. This embodiment is such that the still image sequence related to the video playback is performed from the video file and the scene description file by using a command input.

The video playback portion 2 takes the video data of the video file designated by the controller 7 in order from the storage unit 1 by the command from the command input portion 8 and inputs them to the video playback portion 2. The video playback portion 2 takes the video data in order and outputs the screen output signal, the audio output signal and the current playback time on the display 6. The display 6 takes the playback time, the screen output signal and the audio output signal and performs the display of the playback time, the screen output and the audio output.

Further, when the time information is inputted to the command input portion 8, a designated time information is inputted to the video playback portion 2 via the controller 7, and the playback is started from the designated time. Further, the playback time information (Tv) is inputted to the time information sequence output portion 4 similarly to the first embodiment and, accompanied with an elapse of time, the time information sequence and the still image sequence information are renewed, and new time information sequence and still image sequence are displayed on the display 6.

As for the command input method, various input methods are conceived. One example is a method of directly designating the time information, whereby the video playback, the display of time information sequence, and the still image sequence are performed by using the inputted time by the user. Another method is to designate a time information in the displayed time information sequence, or to designate a still image in the still image sequence and input the designated time or still image. Further, it is possible to perform a time designation by using means for designating the time information sequence before and after and the time information before and after such as skip buttons 20, 21, 22, 23 as shown in FIG. 8.

Figure 8:
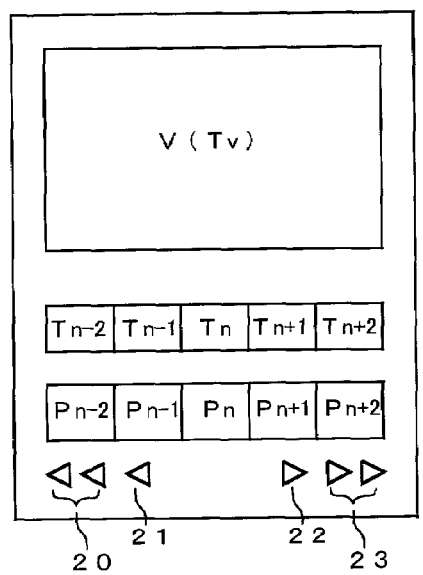
FIG. 8 is a view showing a display example of the video displayed on the display of FIG. 7.

For example, in FIG. 8, though the time information sequences up to times $T_{n-2}$ to $T_{n+2}$ and the still image sequence ($P_{n-2}$ to $P_{n+2}$) are displayed, the skip button 20 can designate the movement of these sequences to five former time information sequences ($T_{n-3}$ from $T_{n-7}$) and the still image sequences ($P_{n-3}$ from $P_{n-7}$) in point of time. Further, the skip button 21 can designate the movement of these sequences to one former time information sequences ($T_{n-3}$ to $T_{n+1}$) and the still image sequences ($P_{n-3}$ to $P_{n+1}$) in point of time.

Next, a third embodiment of the present invention will be described with reference to the block diagram of FIG. 9. The scene description file read-in portion 3 performs reading from the storage unit 1 via a cache memory 9. The cache memory 9 reads in order the scene description information to be displayed next to the scene description information being displayed on the current display 6 from the storage unit 1. The actions thereafter are the same as those of the first embodiment and, therefore, the description thereof will be omitted.

When the scene description information file capacity is large, a large bandwidth is required each time the scene description information is read and it takes a plenty of times until the next scene description information is read. In addition, there is a possibility of inhibiting the bandwidth to read in the video data from the storage unit. However, when the cache memory 9 is used, the scene description information can be continuously displayed on the display 6. Further, by continuously reading in the scene description information into the cache memory 9, a data transmission bandwidth can be made constant and it is, therefore, possible to continuously reproduce the video without inhibiting a bandwidth necessary for reading the video from the storage unit 1.

Next, a fourth embodiment of the present invention will be described with reference to the block diagram of FIG. 10. Although the above described first and third embodiments were the retrievable video playback units for displaying the video data of the video file stored in the storage unit 1, the time information sequence of the scene description file and the still image sequence information and the like on the display 6, the present embodiment provides a delivery unit which is a server capable of delivering the video data of the video file of the storage unit 1, the time information sequence of the scene description file and the still image sequence information and the like via a network.

In FIG. 10, the video file information designated by the command input portion 21 is inputted to a delivery controller 22 and, by control of the delivery controller 22, the video data designated by the command input portion 21 is taken in order from the storage unit 1 and is inputted to a video transmitting portion 23. At the same time, by control from the delivery controller 22, the scene description data related to the video designated by the command input portion 21 is taken in order from the storage unit 1, and is inputted to the scene description data transmitting portion 24.

The video data and the scene description data are read from the video data transmitting portion 23 and the scene description data transmitting portion 24 at respective characteristic data transmitting rates R1, R2, and are inputted to a network transmitting portion 25, and each data is delivered to a network 26.

The video data transmitting rate R1 can be decided by calculating information content per unit time from a file size of the video file and a video playback time. Further, the scene description data transmitting rate R2 can be decided by calculating information content per unit time from the scene description file size and the video playback time. Another way capable of deciding the transmitting rate is to calculate information content per unit time from the time to be displayed finally in the scene description file and the scene description file size.

Further, the command input portion 21, as shown in FIG. 11, receives the input from a terminal connected via a network 27 at a network receiving portion 28 and may take that information as a command input. By so doing, at that terminal, the same retrieval as that of the first embodiment can be performed.

Next, a fifth embodiment of the present invention will be described with reference to the block diagram of FIG. 12.

Figure 12:
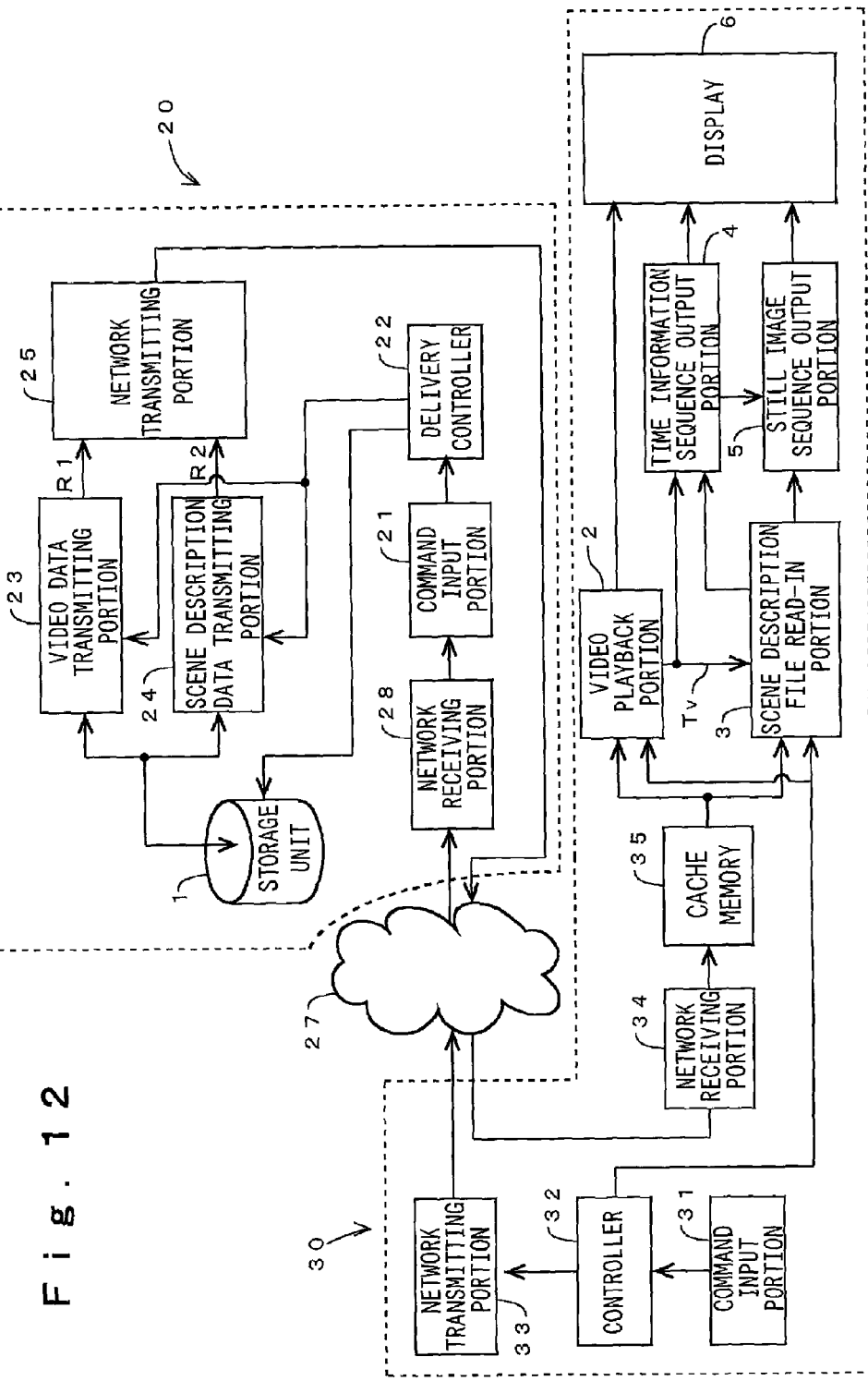
FIG. 12 is a block diagram showing the schematic constitution of a fifth embodiment of the present invention.

In FIG. 12, when the video file is designated at the command input portion 31 of the terminal 30, the designated video file information is inputted to a controller 32 and is outputted to a network transmitting portion 33. The designated image file information is inputted to a network receiving portion 28 of the delivery unit (server 20) from the network transmitting portion 33 via the network 27, and is subjected to a command input processing through the command input portion 21. The video data designated by the delivery controller 22 is taken in order from the storage unit 1, and is inputted to the video data transmitting portion 23. Similarly, the scene description data related to the video designated at the command input portion by control from the delivery controller 22 is taken in order from the storage unit 1 and is inputted to the scene description data transmitting portion 24.

The video data and the scene description data are read from the video data transmitting portion 23 and the scene description data transmitting portion 24 at respective characteristic data transmitting rates R1, R2, and are inputted to the network transmitting portion 25, and respective data are delivered to the network. The delivered video data and scene description data are inputted to a network receiving portion 34 of the terminal 30 via network 27 and temporarily stored in a cache memory 35.

The cache memory 35 reads in the video information currently displayed on the display 6, the video information to be displayed next to the scene description information and the scene description information in order from the network. The actions thereafter are the same as those of the first embodiment.

In general, when the scene description information file capacity is large, a large bandwidth is required each time the scene description information is read and it takes a plenty of times until the next scene description information is read. In addition, there is a possibility of inhibiting the bandwidth to read the video data from the storage unit. However, when the cache memory 35 is used, the scene description information can be continuously displayed on the display 6. Further, by continuously reading in the scene description information into the cache memory 35, a data transmission bandwidth can be made constant and it is, therefore, possible to continuously play back the video without inhibiting a bandwidth necessary for reading the video from a video delivery unit network-connected.

Furthermore, when the time information is designated from the command input portion 31, the designated time information is inputted to the delivery controller 22 via the controller 32, the network transmitting portion 33, the network 27, the network receiving portion 28 and a command input portion 21. Subsequently, the video data and the scene description data from the designated time are taken in order from the storage unit 1, and are inputted to the video data transmitting portion 23 and the scene description data transmitting portion 24. These data are inputted to the video playback portion 2 and the scene description file read-in portion 3 through the network transmitting portion 25, the network 27, the network receiving portion 34 and the cache memory 35, and the playback of the video from the above described designated time is started. The playback time information (Tv) is inputted to the scene description file read-in portion 3 and the time information sequence output portion 4 from the video playback portion 2, and the time information sequence and the still image sequence information are renewed and new time information sequence and the still image sequence are displayed on the display 6. A display state of the display 6 is the same as FIG. 3A, FIG. 4A.

As is clear from the above description, according to each of the above described first to fifth embodiments, since the scene description information can be displayed to match the playback of the video, the retrieval and the browsing of the video before and after the video being played back can be effectively performed.

Further, by selecting a necessary scene, for example, by using the skip buttons 20 to 23 of FIG. 8, the playback from that scene and the scene description information before and after that scene can be displayed and, therefore, the video can be effectively retrieved at a random access time.

Furthermore, the video data and the scene description information can be delivered at a constant transmission speed (rate) from the delivery unit or the server unit and it is, therefore, possible to smoothly perform the video playback and the video retrieval in the terminal network-connected.

Next, the invention will be described below, wherein a plurality of video files are simultaneously played back without increasing the processing load of the playback terminal, or a plurality of videos can be transmitted and read or looked even in a limited network bandwidth.

Figure 13:
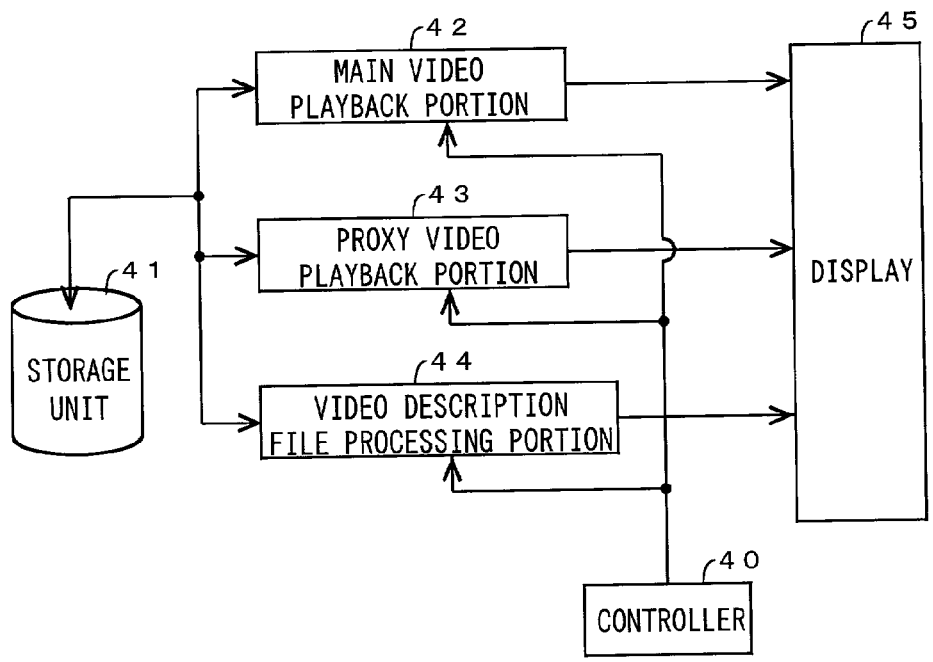
FIG. 13 is a block diagram showing the schematic constitution of a sixth embodiment of the present invention.

A sixth embodiment shown in FIG. 13 is such that a main video file and a proxy video file are simultaneously played back and displayed. By control of a controller 40, a video description file processing portion 44 reads a designated video file from a storage unit 41. Next, the video description file processing portion 44 reads in order a designated first main video file from the storage unit 41 designated by the video description file and input it to a main video playback portion 42. The main video playback portion 42 reads in order the main video data which is the first video data and outputs a screen signal. A display 45 takes the screen output signal and the audio output signal from the main video playback portion 42 and performs the screen output and the audio output.

Further, the video description file processing portion 44 takes in order the proxy video file which is a second video designated by the video description file from the storage unit 41 and inputs it to the proxy video playback portion 43. The proxy video playback portion 43 reads in order the proxy video data and outputs the screen signal. The display 45 takes the screen output signal and the audio output signal from the proxy video playback portion 43 and performs the screen output and the audio output.

As for the above described video description file format, it can be described by using SMIL (Synchronized Multimedia Integration Language) standardized by W3C (World Wide Web Consortium) and the like.

As one example of the video description file format, if it is, for example, constituted by the main video 1 and the proxy video 2, it can be described as follows: ID#M1, video size (HM1, VM1), display position (XM1, YM1) ID#2, video size (HS2, VS2), display position (XS2, YS2) ID#M1, file storing position #M1, file name #M1 ID#S2, file storing position #S2, file name #S2

Figure 14A:
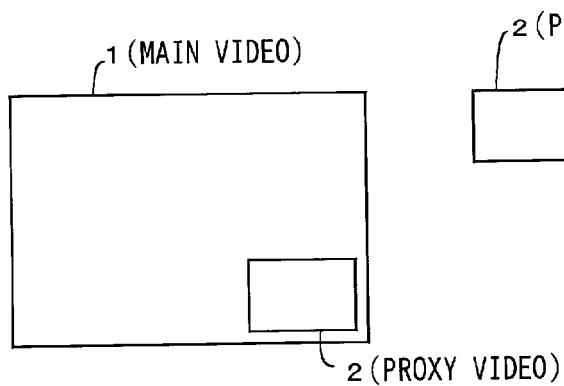
FIGS. 14A, 14B are views showing display examples of a main video and a proxy video.
Figure 14B:
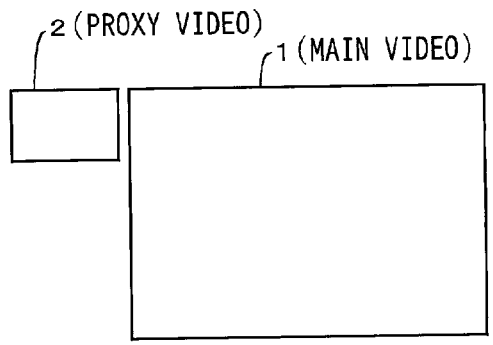

As for the output position of the proxy video, the proxy video 2 can be displayed inside the screen of the main video as shown in FIG. 14A, or the proxy video 2 can be displayed outside of the screen of the main video 1 as shown in FIG. 14B.

Here, in contrast to the main video file, the proxy video file can use a file being small in a video size or an encoded bit rate. In this way, the processing load necessary for playing back the proxy video can be reduced in contrast to the processing load necessary for playing back the main video.

Furthermore, as the proxy video file, an abstracted video having a short playback time in contrast to the main video file can be used. As the abstracted video, an abstracted time video such as shown in FIG. 15, an abstracted shot video such as shown in FIG. 16 and an abstracted still image video such as shown in FIG. 17 can be used.

Figure 15:
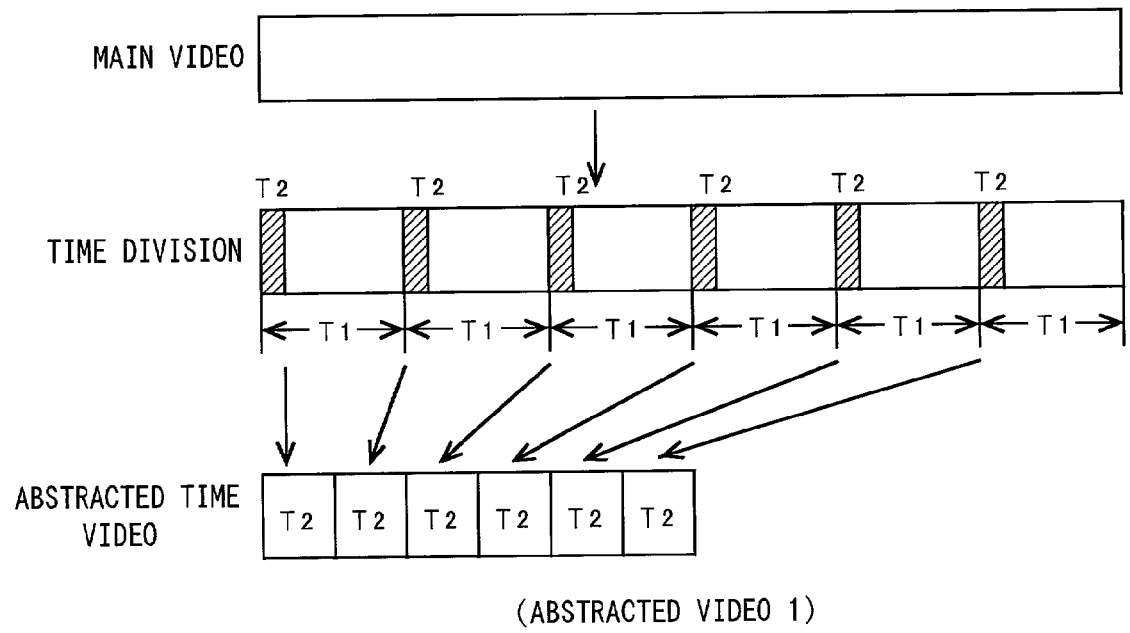
FIG. 15 is an explanatory drawing of a first abstracted video.

In the case of the abstracted time video, in FIG. 15, first, the main video is divided into time intervals T1. Next, regarding each divided section T1, a section T2 only of the top of each section is, for example, extracted, and the video combining these sections T2 is used as the abstracted time video.

Figure 16:
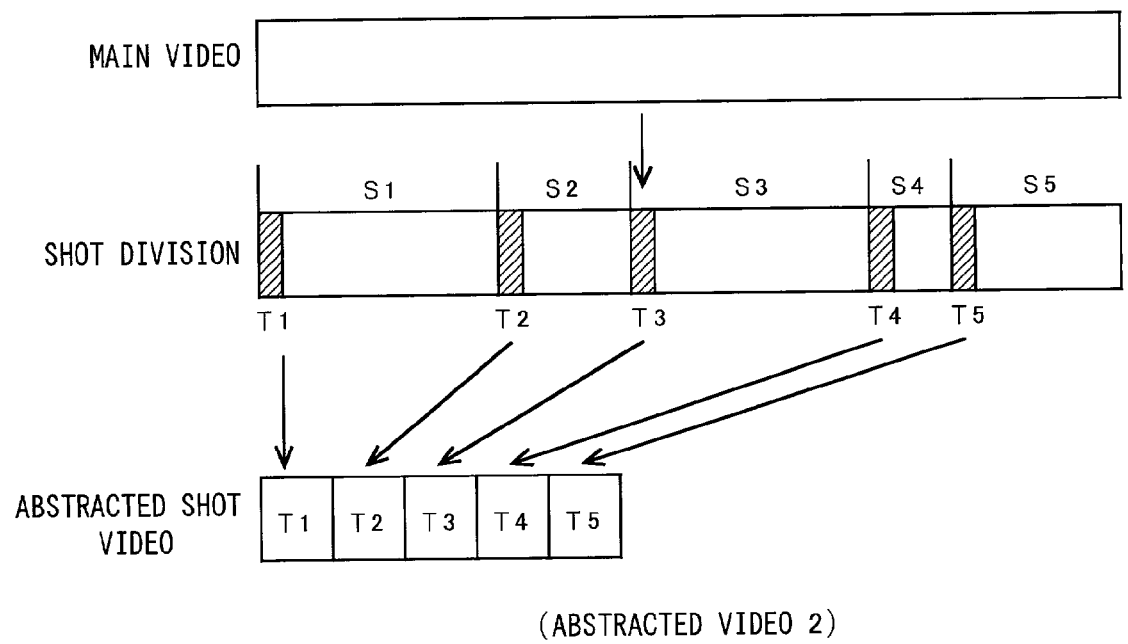
FIG. 16 is an explanatory drawing of a second abstracted video.

In the case of the abstracted shot video, in FIG. 16, first, the main video is divided into shots which are changing units scene of the main video. As for the method of shot division, the cutting point detection method of the patent application by the present applicant, which is disclosed in Japanese Patent Laid-Open No.11-252509, can be used. Next, regarding each shot S1, S2, . . . , sections T1, T2, . . . only of the top of each shot are, for example, extracted, and the video combining these sections is used as the abstracted shot video. Incidentally, as for the length of sections T1, T2, . . . , it is possible to use a constant length or decide a length proportional to the shot length. Further, it is possible to combine several representative shots selected from the shots and take them as the shot videos.

Figure 17:
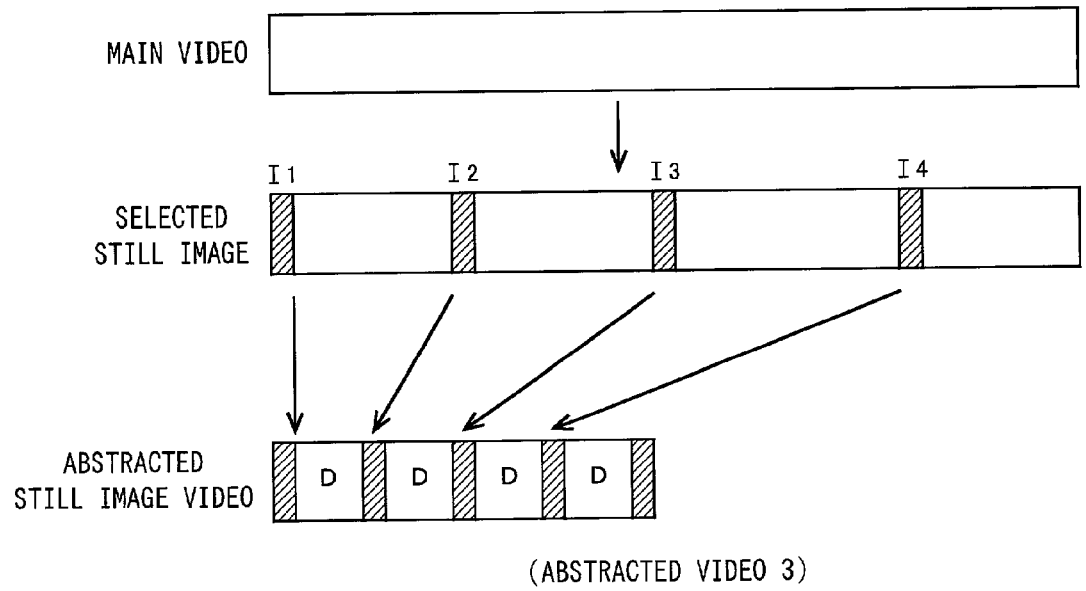
FIG. 17 is an explanatory drawing of a third abstracted video.

In the case of the abstracted still image video, in FIG. 17, first, a representative still image is selected from the main video. As for the selection method, the top videos and the like of the sections used by the abstracted time and abstracted shot can be used. Next, the abstracted still image video is formed by combining these still images. In this case, in order to display a representative still image for a constant period of time and switch over to the next still image, a dummy information D of certain time intervals is added and formed so that it can be used as a pseudo video.

Further, the proxy video playback portion 43 in FIG. 13 can use a playback processing system having a small processing load in contrast to the main video mage playback portion 42. For example, there is a method of reducing the processing load by reducing the number of playback processing frames by sampling the number of frames to be played back at constant intervals. Further, as disclosed in Japanese Patent Application No. 2000-00095 "Encoded Video Data Playback Unit And It's Storage Medium" by the patent application by the present patent applicant, there is also a method of decoding a part only of the video information at the time when a compressed data is decoded so as to reduce the processing load.

Figure 18:
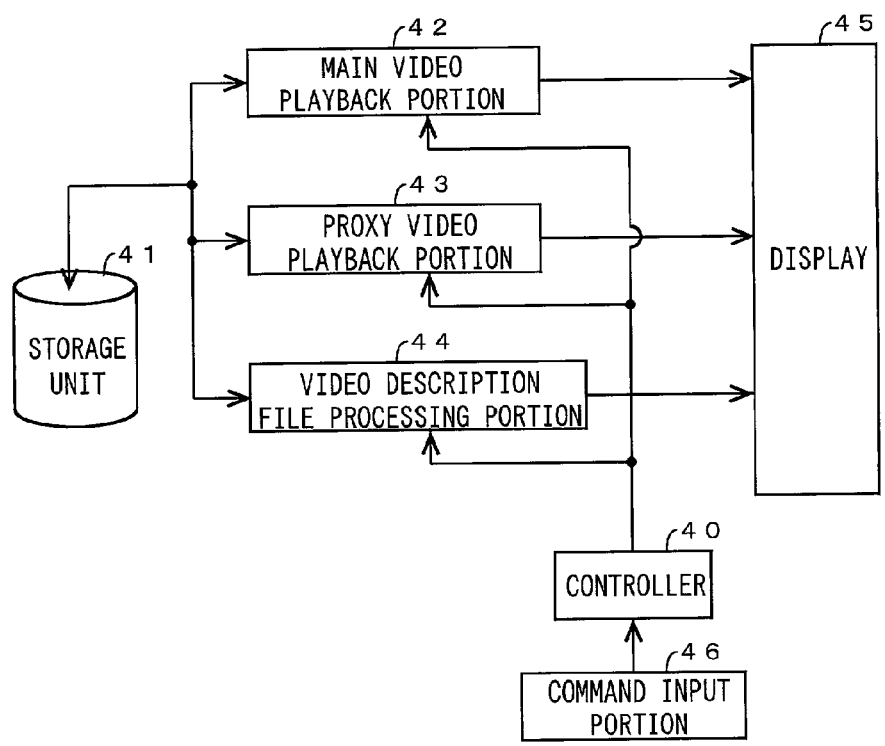
FIG. 18 is a block diagram showing the schematic constitution of a seventh embodiment of the present invention.

Next, a seventh embodiment of the present invention will be described with reference to the block diagram of FIG. 18. This embodiment is characterized in that a main video file and a proxy video file are switched by using a command input.

By control of the controller 40, the video description file processing portion 44 reads in the designated video description file from the storage unit 41 and displays the designated main video 1 and proxy video 2 as described in the sixth embodiment on the display 45.

Next, by order from the command input portion 46, when the controller 40 performs the switching control of the main video and the proxy video, the proxy video file information is read in the video description file processing portion 44 as the main video file (hereinafter, referred to as new main video file) and, conversely, the main video file information as the proxy video file (hereinafter, referred to as new proxy video file). Subsequently, the video description file processing portion 44 takes in order the new main video file and the new proxy video file from the storage unit 41 and inputs them to the main video playback portion 42 and the proxy video playback portion 43, respectively.

The main video playback portion 42 reads in order the main video data of the new main video file and outputs a screen signal, and the proxy video playback portion 43 reads in order the new proxy video data and outputs the screen signal. The display 45 takes the screen output signal and the audio output signal from the main video playback portion 42 and the proxy video playback portion 43 and performs the screen output and the audio output.

Figure 19:
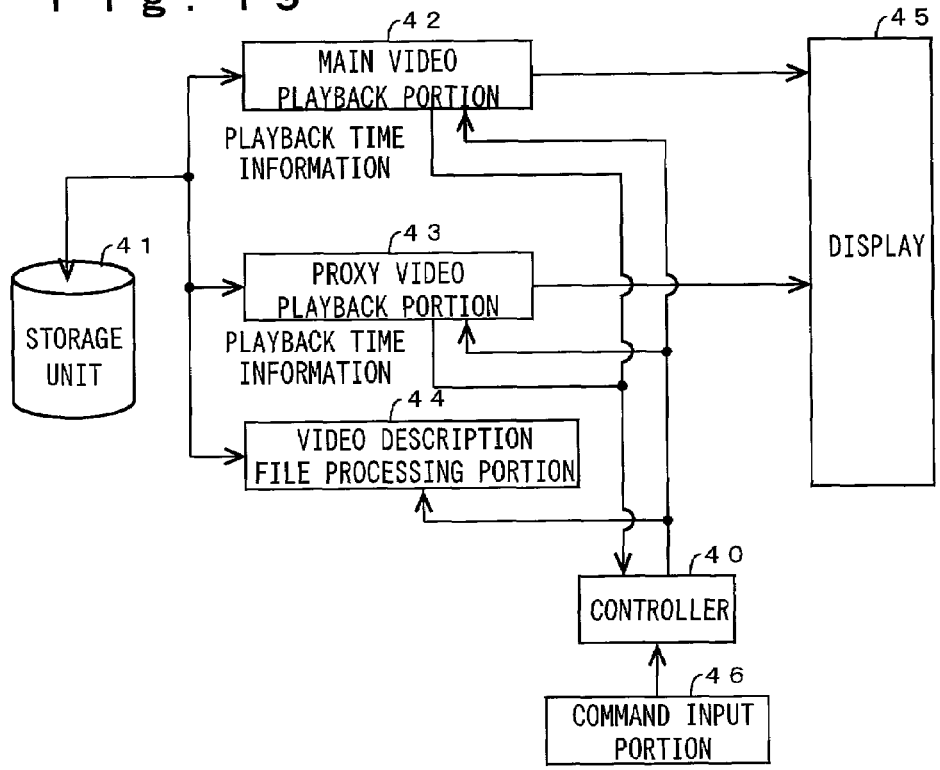
FIG. 19 is a block diagram showing a modified embodiment of the seventh embodiment.

Incidentally, the setting of the playback starting time at the time of switching from the playback of the main video to the playback of the proxy video can utilize several setting methods. As one method, a starting time of each video is utilized as the playback time at the time of switching. As another method, the time of the main video of FIG. 19 is inputted to the controller 40 and that time can be taken as the playback starting time of the new main video so as to start the playback.

Figure 20:
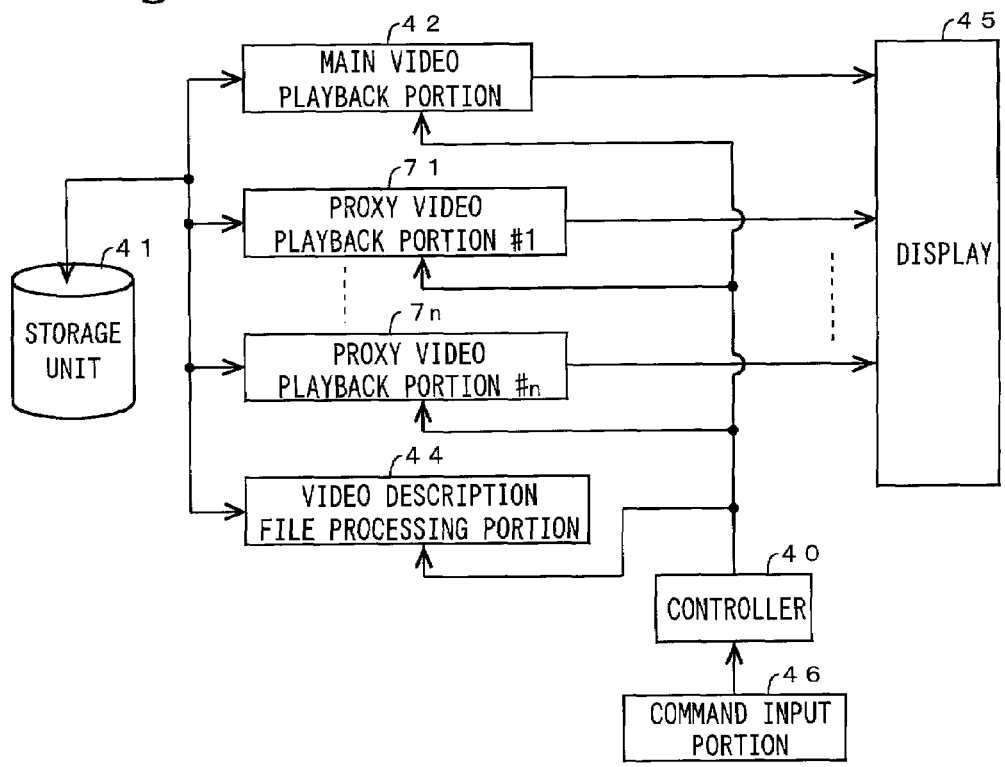
FIG. 20 is a block diagram showing the schematic constitution of an eighth embodiment of the present invention.

Next, an eight embodiment of the present invention will be described with reference to FIG. 20. This embodiment is characterized in that the main video file and a plurality of proxy video files are switched by using the command input.

By control from the controller 40, the video description file processing portion 44 reads in the video description file from the storage unit 41, and the main video file (for example, the first video file) designated by the video description file is read in order from the storage unit 41 to the main video playback portion 42, and the video is displayed on the display 45. Further, the proxy videos 1 to n are read in order from the storage unit 41 to the proxy video playback portions 71 to 7n, and n pieces of the proxy videos are displayed on the display 45.

Figure 21A:
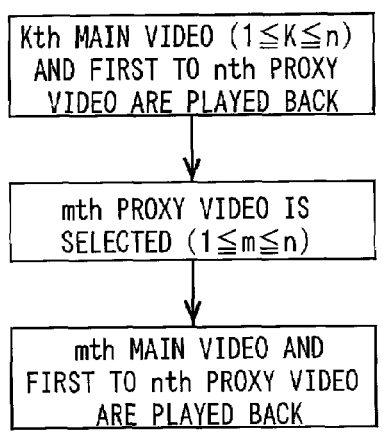
FIGS. 21A, 21B are explanatory drawings of a switching processing of the main video and the proxy video.

Next, by control from the command input portion 46, when a certain proxy video file (for example, the mth proxy video file) is designated from the controller 40, in order to switch the main video, the information related to the mth main video file is read into the video description file processing portion 44, and the mth main video file is taken in order from the storage unit 41 and inputted to the main video playback portion 42. The main video playback portion 42 reads in order the mth main video data and display the video. In this case, the main video being played back is played back from one within the proxy videos being played back. The switching flowchart is shown in FIG. 21A.

As for the display method of these videos, in the same way as in FIG. 14, there are methods such as displaying the n pieces of proxy videos inside the screen of the main video or displaying the proxy video outside of the screen of the main video.

By sufficiently reducing the processing load necessary for playing back the n pieces of the proxy videos, one piece of the main video and the n pieces of proxy videos can be played back even for the playback unit having a limited processing capacity.

As a modified example of the eighth embodiment, in the same way as in FIG. 8, there is a video switching method as follows. By control from the controller 40, the video description file processing portion 44 reads in the video description file from the storage unit 41, and the main video file (for example, the 0th video file) designated by the video description file is read in order from the storage unit 41 to the main video playback portion 42 and is displayed on the display 45. Further, the proxy video files 1 to n of the first to the nth video files described in the video description file are read in order from the storage unit 41 to the proxy video playback portions 71 to 7n, and n pieces of the proxy videos are displayed on the display 45.

Figure 21B:
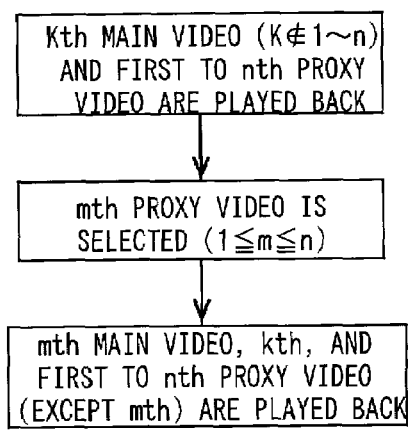

Next, by control from the command input portion 46, when a certain proxy video file (for example, the mth proxy video file) is designated from the controller 40, the mth main video file is played back in the main video playback portion 42 and, at the same time, the information related to the 0th proxy video file is read into the video description file processing portion 44, and the 0th proxy video file is read in order from the storage unit 41 to the mth proxy playback portion so that the playback of the mth proxy video can be switched to the playback of the 0th proxy video. In this way, the proxy video different from the main video being always played back can be play back, and video retrieval efficiency can be enhanced. A switching flowchart of the above described processing is shown in FIG. 21B.

Next, a ninth embodiment of the present invention will be described with reference to FIG. 22. This embodiment is characterized in that the main video, the scene image of the main video and one or a plurality of proxy videos are displayed.

Figure 22:
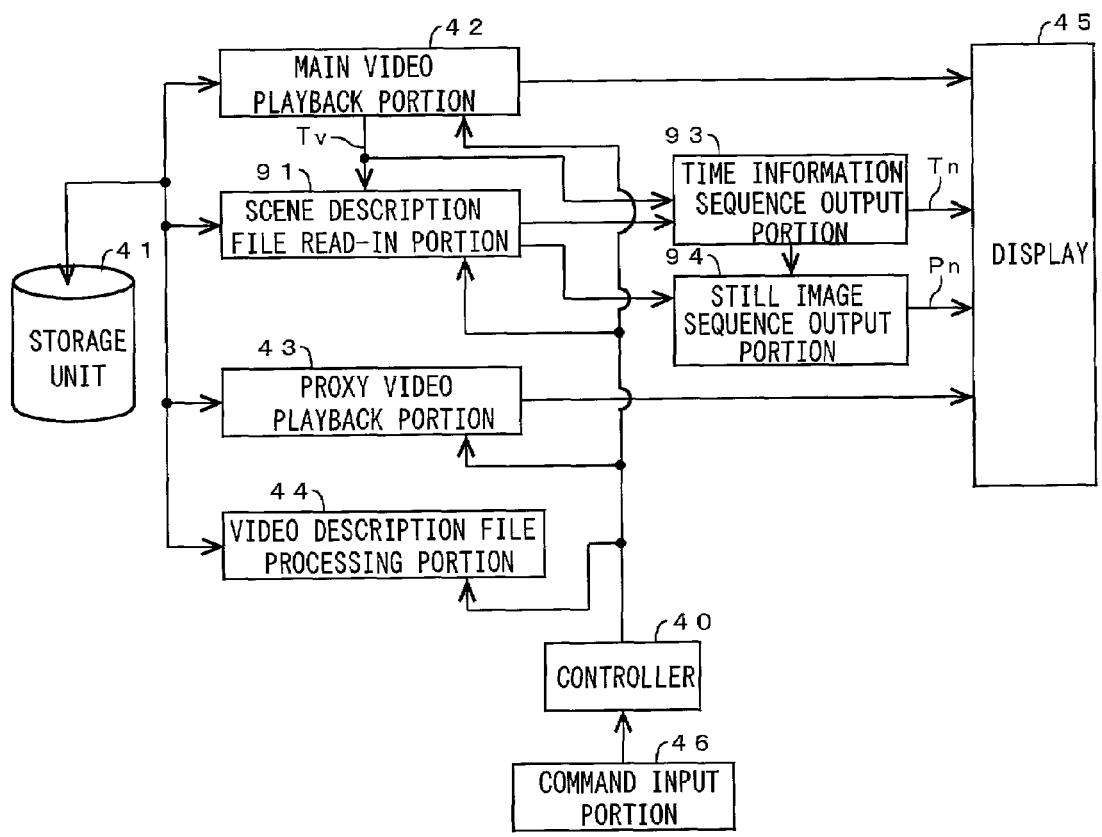
FIG. 22 is a block diagram showing the schematic constitution of a ninth embodiment of the present invention.

In FIG. 22, by control from the controller 40, the video description processing portion 44 reads in the designated video file from the storage unit 41. Next, the video description file processing portion 44 takes in order the main video file designated by the read video description file from the storage unit 41 and inputs it to the main video playback portion 42. The main video playback portion 42 reads the main video data and outputs a screen signal. The display 45 takes the screen output signal and the audio output signal from the main video playback portion 42 and performs the screen output and the audio output.

Further, the proxy video file designated by the video description file is taken in order from the storage unit 41 and is inputted to the proxy video playback portion 43. The proxy video playback portion 43 reads in order the proxy video data and outputs the screen signal. The display 45 takes the screen output signal and the audio output signal from the proxy video playback portion and performs the screen output and the audio output.

Further, by control of the controller 40, a scene description file read-in portion 91 inputs the scene description file corresponding to the video file from the storage unit 41.

The current playback time obtained by the main video playback portion 42 is inputted to the scene description file read-in portion 91 and the time information sequence output portion 93. The scene description file read-in portion 91 takes the time information sequence data and the still image sequence output data from the storage unit 41 based on the inputted current playback time information, and inputs them to the time information sequence output portion 93 and the still image sequence output portion 94, and displays the time information sequence and the still image sequence on the display 45. As for the main video and the proxy video, the display method such as those of FIG. 14A, FIG. 14B can be used. As for the main video and the time information sequence and the still image information sequence, the display method such as those of FIG. 3A, FIG. 4A can be used.

The renewal of the display content is performed at the time information sequence output portion 93. The timing of the renewal of the display content is the same as those described in FIGS. 3A, 3B and FIGS. 4A, 4B and FIG. 5, therefore, the description thereof will be omitted.

As for the time information sequence data to be inputted, the time information sequence data positioned before and after the current playback time can be read from the time information sequence file stored in the storage unit 41. As for the still image sequence data, the still image sequence corresponding to the read time information sequence data can be read from the still image file stored in the storage unit 41. As for the content of the time information sequence data, the description method as described in the first embodiment can be used. As for an example of the time information, the video scene switching time of FIG. 6A and the key frame point time in the scene of FIG. 6B can be used.

Figure 23:
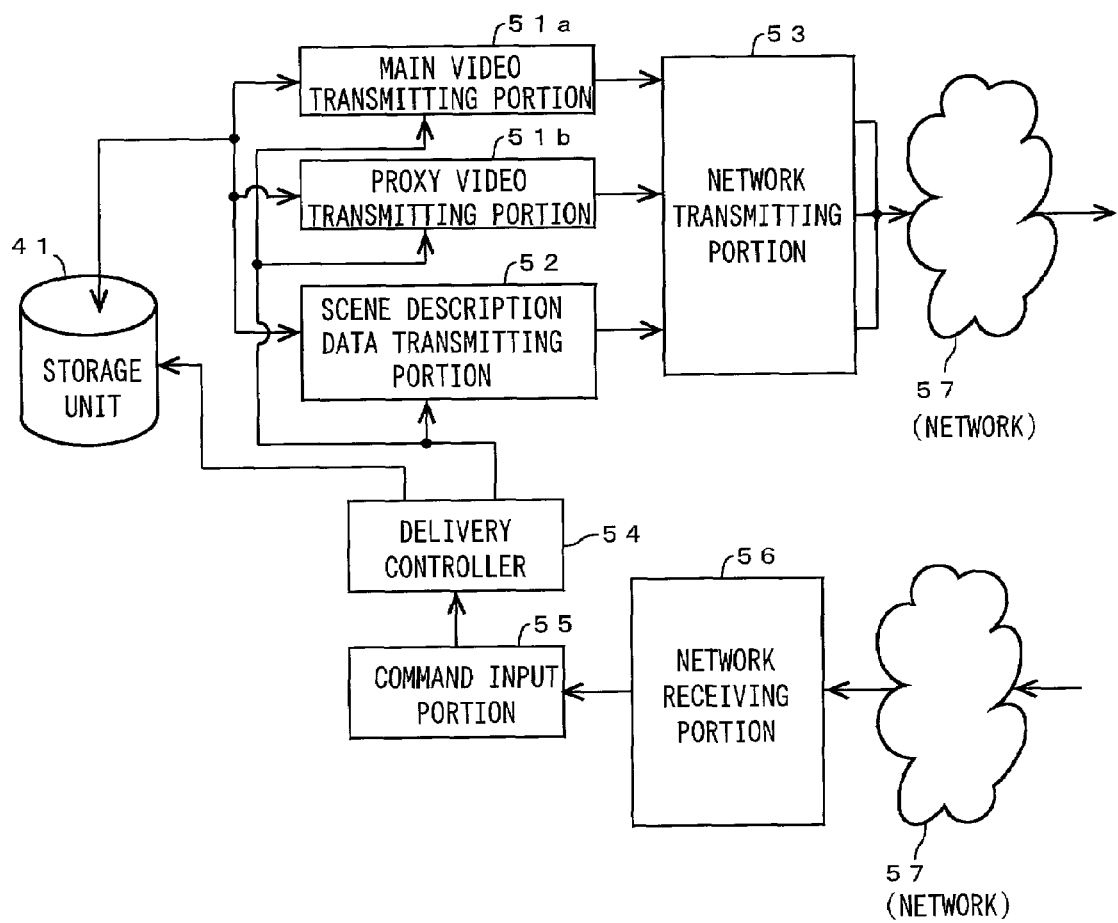
FIG. 23 is a block diagram showing the schematic constitution of a tenth embodiment of the present invention.

Next, the ninth embodiment of the present invention will be described with reference to FIG. 23. This embodiment is such that the video file information designated by a command input portion 55 is inputted to a delivery controller 54 and, by control from the delivery controller 54, the video data designated by the command input portion 55 is taken in order from the storage unit 41 and is inputted to a main video transmitting portion 51a and/or a proxy video transmitting portion 51b. Similarly, by control from the delivery controller 54, the scene description data related to the video designated by the command input portion 55 is taken in order from the storage unit 41 and is inputted to a scene description data transmitting portion 52.

The main and/or proxy video data and the scene description data are read from the main video transmitting portion 51a, the proxy video transmitting portion 51b and the scene description data transmitting portion 52, respectively at the designated data rate and are inputted to a network transmitting portion 53, and respective data are delivered to the network.

The main video transmitting rate can be decided by calculating information quantity per unit time from the file size of the video file and the video playback time. As for the scene description data transmitting rate, it can be decided by calculating information quantity per unit time from the scene description file size and the video playback time. As for other method, the transmitting rate can be decided by calculating information quantity per unit time from the time to be displayed finally in the scene description file and the scene description file size.

The command input portion 55 receives an input from the terminal connected via a network 57 at a network receiving portion 56 and may use that information as a command input.

Figure 24:
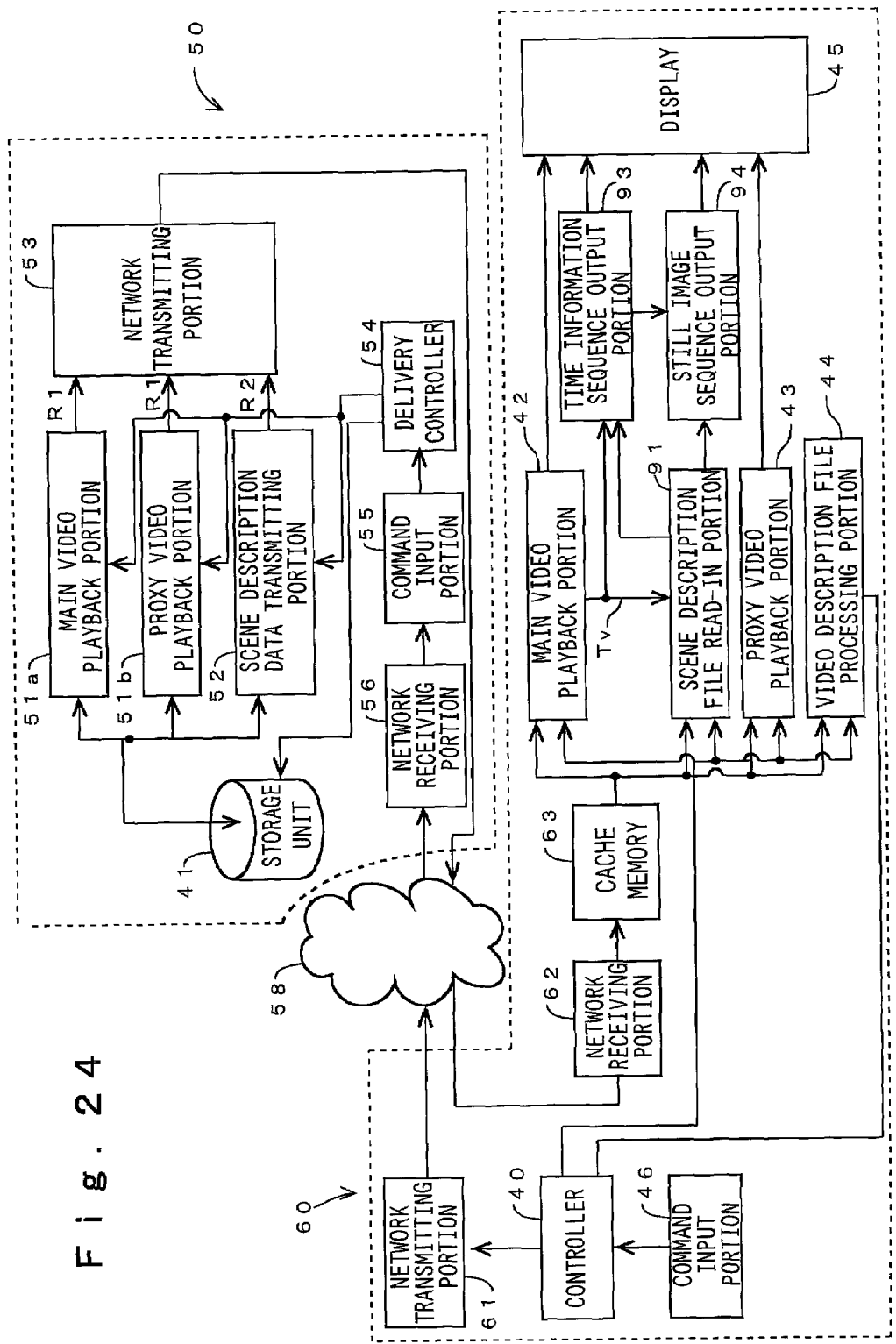
FIG. 24 is a block diagram showing the schematic constitution of an eleventh embodiment of the present invention.
Figure 25:
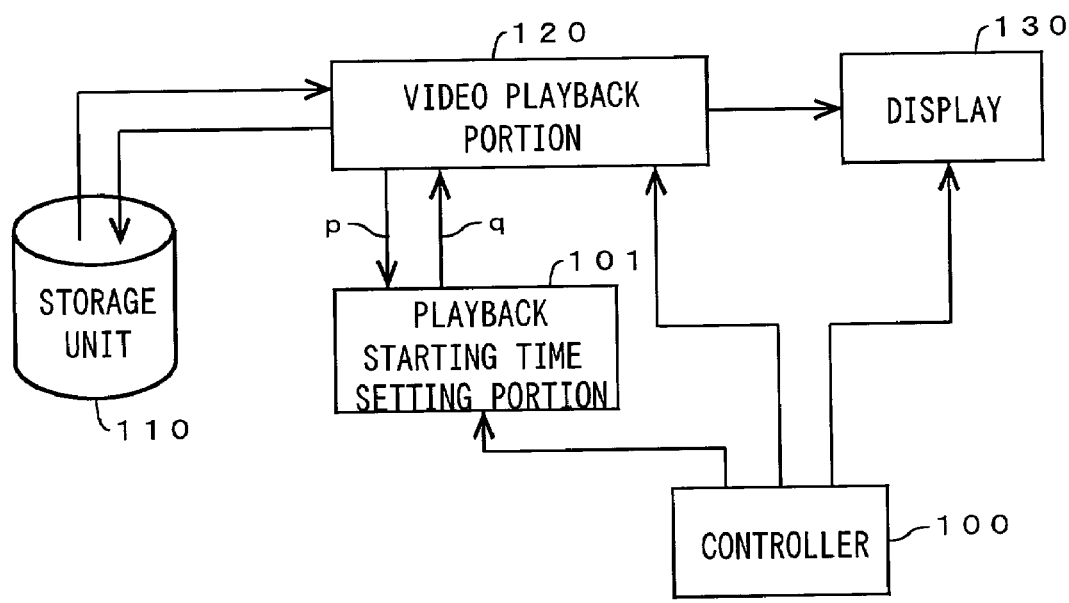
FIG. 25 is a block diagram showing one example of a conventional unit.
Figure 26:
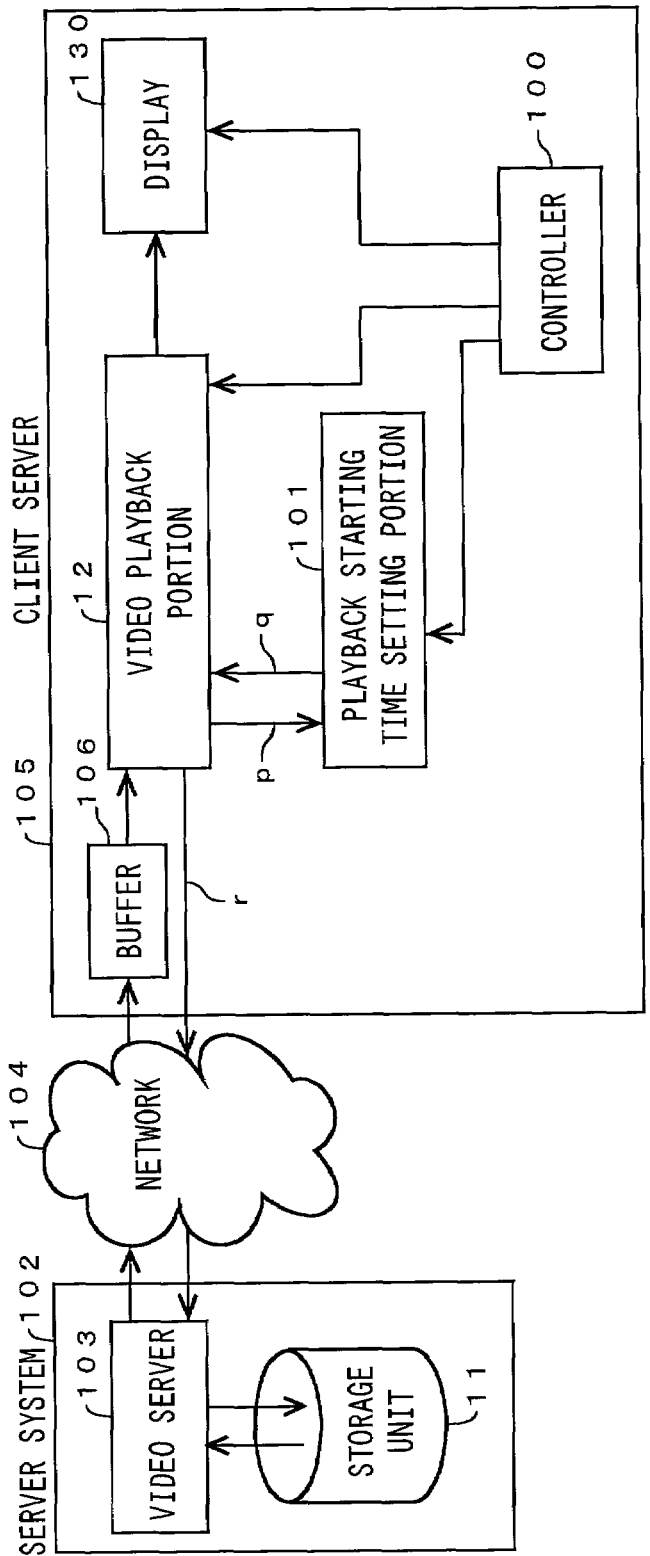
FIG. 26 is a block diagram showing another example of the conventional unit.
Figure 27:
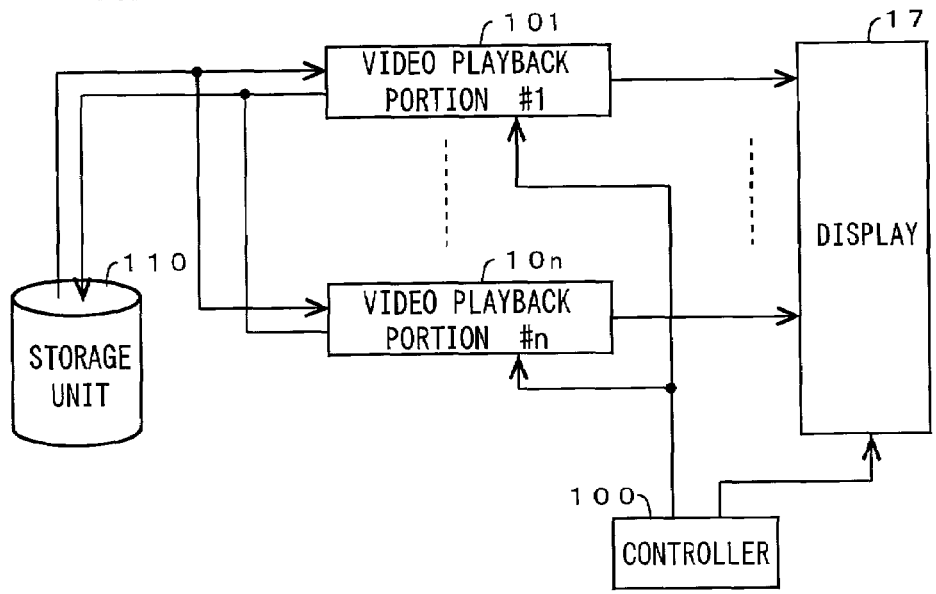
FIG. 27 is a block diagram showing another example of the conventional unit.
Figure 28:
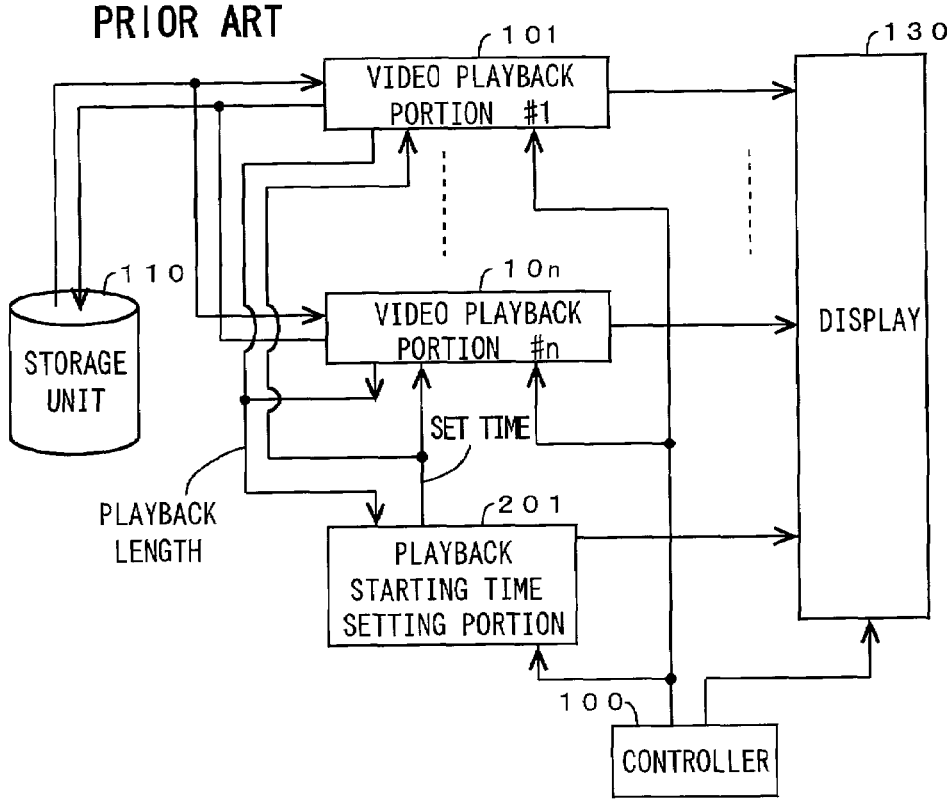
FIG. 28 is a block diagram showing another example of the conventional unit.

Next, an eleventh embodiment of the present invention will be described with reference to FIG. 24. This embodiment is such that, first, by control from the controller 40, the video description file processing portion 44 reads in the designated video description file from the storage unit 41 of a server 50 via a network 58. Next, the video description file processing portion 44 outputs the main video file and the proxy video file designated by the read video description file to a network transmitting portion 61 via the controller 40. The video file information designated by the command input portion 46 of the client unit (terminal unit) 60 is inputted to the controller 40 and is outputted to the network transmitting portion 61.

The designated video file information is inputted to the network receiving portion 56 of the server 50 from the network transmitting portion 61 via the network 58, and a command input processing is performed through the command input portion 55. By control from the delivery controller 54, designated main video and proxy video are taken in order from the storage unit 41 and are inputted to the main video transmitting portion 51a and the proxy video transmitting portion 51b, respectively. Similarly, by control from the delivery controller 54, the scene description data related to the video designated by the command input portion 46 is taken in order from the storage unit 41 and is inputted to the scene description data transmitting portion 52.

The main, proxy video data and the scene description data are read from the main video transmitting portion 51a, the proxy video transmitting portion 51b and the scene description data transmitting portion 52, respectively at the designated data rate and are inputted to a network transmitting portion 53, and respective data are delivered to the network 58. The delivered video data, the proxy video data and the scene description data are inputted to a network receiving portion 62 via the network 58 and are temporarily stored in a cache memory 63.

From the cache memory 63, the main video information, the scene description information and the proxy video information are inputted to the main video playback portion 42, a scene description information read-in portion 91 and the proxy video playback portion 43, respectively. The action of the video description file processing portion 44 is the same as the action of FIG. 22 and, therefore, the description thereof will be omitted.

The cache memory 63 reads in order the video information, the proxy video and the scene description information to be displayed next to the main video information, the proxy video and the scene description information currently displayed on the display 45 from the server 50 via the network 58.

In general, when the scene description information file capacity is large, a large bandwidth is required each time the scene description information is read. Therefore it takes a plenty of times until the next scene description information is read. In addition, there is a possibility of inhibiting the bandwidth to read the video data from the storage unit. However, when the cache memory 63 is used, the scene description information can be continuously displayed on the display 45. Further, by continuously writing the scene description data into the cache memory 63, a data transmission bandwidth can be made constant and it is, therefore, possible to continuously play back the video without inhibiting a bandwidth necessary for reading the video from the delivery unit network-connected.

As described above, according to the above described sixth to eleventh embodiments, since a plurality of videos are constituted by the main video and the proxy video and these videos are allowed to be played back, a plurality of videos can be played back even in a limited transmission bandwidth and decoding capacity.

Further, the video scene contained in the video can be read and retrieved so as to play it back.

Further, by displaying the description information in step with the playback of the video, the browsing and the retrieval before and after the video being played back can be effectively performed.

Further, according to the present invention, regarding the video file inside the server network-connected, a plurality of video files can be played back without increasing the processing load of the playback terminal or the video can be transmitted and read even in a limited network bandwidth.

Each of the first to eleventh embodiments is preferably realized by a personal computer, and the program of the processing of each embodiment can be recorded and provided in a computer readable program recording medium. The recording medium includes not only a portable type recording medium such as an optical disc, a floppy disc, a hard disc and the like, but also a transmission medium temporarily recording and holding data such as a network.

What is claimed is:

1. A video playback unit comprising:
    video playback means for reading in a designated video file and outputting a video of the video file for playback;
    scene description file read-in means for reading in a scene description file which describes a scene inside the video file;
    means for outputting a time information sequence existing before and after the current playback time of the video within time information described in the scene description file;
    means for outputting the still image sequence corresponding to the time information displayed, wherein the still image is described in the scene description file;
    means for renewing the display of the time information sequence and the still image sequence by synchronizing with the current playback time of the video while playing back the video; and
    display means for displaying said video, time information sequence and still image sequence.

2. The video playback unit according to claim 1, wherein said video playback means starts to play back the video from the time decided by the time information selected from within at least one of said time information sequence and still image sequence or the time information of a still image.

3. The video playback unit according to claim 1, comprising:
    a cache memory storing in advance said scene description file, wherein
    said scene description file read-in means reads the time information sequence and a still image display sequence from the cache memory when the display of said time information sequence and the still image sequence are changed.

4. a video delivery unit having: means for delivering a video data related to the designated video file from a server at a constant transmission rate;
    and means for delivering a scene description data which describes the scene of the video file from the server by synchronizing with the video data at a constant transmission rate; a cache memory for storing the video data and the scene description data in a received order; video playback means for reading in the Video data stored in the cache memory and outputting the video data for playing back; scene description file read-in means for reading in the scene description file stored in the cache memory; means for outputting the time information sequence existing before and after the playback time of the video wherein the time information is described in the scene description data: means for outputting the still image sequence corresponding to the time information displayed wherein the still image is described in the scene description data; means for changing a display of the time information sequence and the still image sequence by synchronizing the playback time of the video: and display means for displaying video, time information sequence and still image sequence.

5. The video delivery unit according to claim 4, wherein the transmission rate of said scene description data is decided by a file size and a scene information described in the scene description file.

6. The video playback unit according to claim 1, wherein said scene description file read-in means reads in the scene description file corresponding to the predetermined number of time information sequences and still image sequences.

7. The video playback unit according to claim 1, wherein means for outputting said time information sequence and the still image sequence changes the time information sequence and the still image sequence being displayed to the time information sequence to be displayed next and the still image sequence corresponding to the time information sequence, respectively, when said playback time of the video has passed designated time information.

8. A Video playback unit according to claim 4, comprising means for transmitting the time, which is decided by the time information selected within time information sequence and still image sequence or the time information of the still image to the video delivery unit; wherein the video data and the scene description data corresponding to the time information are received from the video delivery unit, the received video data is played back and displayed, and the time information sequence and the still image sequence from the received scene description data are displayed.

9. The video playback unit according to claim 1, wherein said time information sequence is at least one of the time information sequence which increases by a designated time step, the time information sequence of the top of a cutting point which shows a scene change of the video, the time information sequence of a key frame point which shows a center of the video scene, the time information sequence which shows a switching point from non-audible sound to audible sound of the audio, the time information sequence which shows a time when a specific effective sound such as clapping, laughter has generated, the time information sequence which shows a time when a specific video such as a telop and a CG video has generated and the time information sequence designated arbitrarily.

10. A non-transitory computer readable recording medium recorded with a program, causing a computer to execute steps, said steps comprising: a process for reading in a designated video file and for outputting the video of the video file for playback; a process for reading in the scene description file which describes the scene inside the video file; a process for outputting the time information sequence existing before and after the current playback time of the video wherein the time information is described in the scene description file; a process for outputting the still image sequence corresponding to the time information displayed wherein the still image is described in the scene description file; and a process for changing the display of the time information sequence and the still image sequence by synchronizing with the current playback time of the video while playing back the video.

11. A non-transitory a computer readable recording medium according to claim 10, further being recorded with a program wherein it is determined whether the playback time of video has passed a designated time information or not and, when determined that it has passed, the time information sequence and the still image sequence being displayed are changed to the time information sequence and the still image sequence corresponding to the time information sequence to be displayed next and outputted.

12. A video playback unit of a plurality of videos comprising:
- video description file processing means for reading in a video description file of a designated video group;
- main video playback means for playing back a plurality of frames of a first main video file designated by the video information described in the video description file;
- proxy video playback means for playing back a plurality of frames of a second proxy video file designated by the video information described in said video description file; and
- display means for displaying the first main video including a plurality of frames and the second proxy video including a plurality of frames played back by said main video playback means and proxy video playback means,
- wherein said proxy video file is small in a file size or a coded bit rate in contrast to said main video file.

13. The video playback unit of a plurality of videos according to claim 12, wherein
said second proxy video file is displayed inside or outside the display screen of said first main video file.

14. The video playback unit of a plurality of videos according to the claim 13, comprising:
- means for changing the playback display of the second proxy video file to the playback display of the second main video file; and
- means for changing the playback display of the first main video file to the playback display of the first proxy video file;
- wherein the first proxy video file is displayed inside or outside the display screen of the second main video file.

15. A video playback unit of a plurality of videos comprising:
- video description file processing means for reading in a video description file of a designated video group;
- proxy video playback means for playing back a plurality of frames of the proxy video files of a plurality of video files designated by the video information described in the video description file;
- means for selecting one video file from the displayed proxy video file; and
- means for changing the selected proxy video file to the playback display of the main video file.

16. A video playback unit of a plurality of videos comprising:
- video description file processing means for reading in a video description file of a designated video group;
- main video playback means for playing back the first main video file designated by the video description file;
- proxy video playback means for playing back a plurality of frames of the first to the nth proxy video files designated by the video description file;
- means for selecting an arbitrary proxy video file from the displayed n pieces of the proxy video files; and
- means for switching the first main video file being displayed to the main video playback display of the arbitrary proxy video file.

17. The video playback unit of a plurality of videos according to claim 16, wherein
the playback time of the arbitrary proxy video is taken as a playback starting time of the optional main video file at the time when switched to the playback display of said arbitrary main video file.

18. A video playback unit of a plurality of videos comprising:
- video description file processing means for reading in a video description file of a designated video group;
- main video playback means for playing back the first main video file designated by the video information described in the video description file;
- proxy video playback means for playing back a plurality of frames of the second to the nth proxy video files designated by the video information described in the video description file;
- means for selecting an arbitrary proxy video file from the playback proxy video file; and
- means for changing the playback display of the arbitrary proxy video file to the playback display of the main video file, and changing the playback display of said first main video file to the playback display of the proxy video file.

19. The video playback unit of a plurality of videos according to claim 18,
the playback time of the arbitrary proxy video file is taken as the playback starting time of the main video file at the time when said arbitrary proxy video file is switched to the playback display of the main video file, and the playback time of the first main video file is taken as the playback starting time of the arbitrary proxy video file at the time when said first main video file is switched to the playback display of the proxy video file.

20. The video playback unit of a plurality of videos according to claim 12, comprising:
- means for reading in the scene description file which describes the scene inside the selected main video file,
- wherein the scene inside the main video file is displayed on said display means based on the scene information described in the scene description file.

21. The video playback unit of a plurality of videos according to claim 20, wherein
the scene information described in said scene description file are scenes existing before and after the playback time of said main video file.

22. The video playback unit of a plurality of videos according to claim 20, wherein
the scene information described in said scene description file is the time information and the still image, the video playback unit comprising:
- means for outputting the time information sequence existing before and after the playback time of said main video file within said time information; and
- means for outputting the still image sequence corresponding to said time information sequence within said still image, wherein
- said time information sequence and still image sequence are displayed on said display means.

23. The video playback unit of a plurality of videos according to claim 22, wherein
the displays of said time information sequence and said still image sequence are changed by synchronizing with the playback time of said main video file.

24. A video delivery unit comprising:
- means for delivering a designated video description file from a server;

means for delivering the main video file and the proxy video file described in the video description file from the server at a constant transmission rate;

means for delivering the scene description file which describes the scene of the video file described in the video description file from the server by synchronizing with said main video data at a constant transmission rate.

25. The video delivery unit according to claim 24, wherein the transmission rate of said scene description file is decided from the file size and the scene information described in the scene description file.

26. A video playback unit which receives said main video file, the proxy video file and the scene description file delivered from the video delivery unit according to one of claims 24 and 25, the video playback unit of a plurality of videos comprising:

means for reading in said video description file;

a cache memory for storing said main video file, the proxy video file and the scene description file in a received order;

means for reading in the scene description file content stored in the cache memory;

means for outputting the time information sequence existing before and after the playback time of the video, wherein the time information is described in the scene description file;

means for outputting the still image sequence corresponding to the time information displayed, wherein the still image described in the scene description file;

main video playback means for playing back the main video file designated by the video information described in the video description file;

proxy video playback means for playing back the proxy video file designated by the video information described in the video description file;

means for displaying said main video, proxy video, time information sequence and still image sequence; wherein means for outputting said time information sequence changes the displays of the time information sequence and the still image sequence by synchronizing with the playback time of the main video file.

27. The video playback unit according to claim 26, wherein means for outputting said time information sequence changes the time information sequence and the still image sequence being displayed to the time information sequence to be displayed next and the still image sequence corresponding to the time information sequence, respectively, when the playback time has passed the designated time information.

28. The video playback unit according to claim 12, wherein said proxy video file uses the abstract video of 15 the main video file.

29. The video playback unit according to claim 28, wherein the abstract video utilizes the abstract video formed by combining the videos which abstracts a part within each section which divides the main video file into a predetermined time section.

30. The video playback unit according to claim 28, wherein the abstract video utilizes the abstracted video formed by combining the videos which extracts a part within each shot section which divides the main video file into shots.

31. The video playback unit according to claim 28, wherein said abstracted video utilizes the abstracted video formed by combining the still images which extracts the videos of the several times within the main video file.

32. A non-transitory computer readable recording medium comprising the steps of: reading in the video description file of a designated video group; playing back a first main video file designated by the video information described in the video description file; playing back a second proxy video including a plurality of frames of said second proxy video file designated by the video information described in the video description file; and displaying the first main video and the second proxy video played back by said steps.

33. A video playback unit of a plurality of videos comprising:

video description file processing means for reading in a video description file of a designated video group;

main video playback means for playing back a first main video file designated by the video information described in the video description file;

proxy video playback means for playing back a second proxy video file designated by the video information described in said video description file; and display means for displaying the first main video and the second proxy video played back by said main video playback means and proxy video playback means, wherein said proxy video file is small in a file size or a coded bit rate in contrast to said main video file, wherein the main video playback means and the proxy video playback means both play back video at the same time.

* * * * *